United States Patent [19]
Davis et al.

[11] Patent Number: 5,527,462
[45] Date of Patent: Jun. 18, 1996

[54] FILTER WITH AXIALLY MOVABLE WIPER

[75] Inventors: Scott J. Davis; John D. Vander Ark, both of Kalamazoo, Mich.

[73] Assignee: Delaware Capital Formation, Inc., Wilmington, Del.

[21] Appl. No.: 340,184

[22] Filed: Nov. 15, 1994

[51] Int. Cl.$^6$ ................................................ B01D 29/64
[52] U.S. Cl. .................... 210/407; 210/413; 210/414; 210/424; 209/273; 209/387
[58] Field of Search ................................... 210/408, 106, 210/409, 411, 413, 414, 415, 424, 396, 407; 209/273, 385, 387

[56] References Cited

U.S. PATENT DOCUMENTS

| | | | |
|---|---|---|---|
| 336,089 | 2/1886 | Chamberland | 210/413 |
| 1,102,791 | 7/1914 | Overly | 210/413 |
| 1,199,350 | 9/1916 | Collin . | |
| 2,125,532 | 8/1938 | Wells . | |
| 2,173,060 | 9/1939 | Andrews . | |
| 3,365,065 | 1/1968 | Varjabedian . | |
| 3,633,841 | 1/1972 | Bumgardner | 242/67.4 |
| 3,889,893 | 6/1975 | Silverman et al. | 242/67.4 |
| 4,155,841 | 5/1979 | Chupka et al. . | |
| 4,271,019 | 6/1981 | Galletti . | |
| 4,458,474 | 7/1984 | Lee . | |
| 4,519,906 | 5/1985 | Hikosaka et al. . | |
| 4,663,030 | 5/1987 | Chupka et al. . | |
| 5,087,365 | 2/1992 | Davis et al. . | |
| 5,198,111 | 3/1993 | Davis . | |

FOREIGN PATENT DOCUMENTS

| | | |
|---|---|---|
| 058656 | 8/1982 | European Pat. Off. . |
| 207797 | 7/1987 | European Pat. Off. . |
| 2931865 | 4/1980 | Germany . |
| 63-293402 | 11/1988 | Japan . |

*Primary Examiner*—Robert J. Popovics
*Attorney, Agent, or Firm*—Flynn, Thiel, Boutell & Tanis

[57] ABSTRACT

A self-cleaning pressure filter system including a housing having an unfiltered liquid inlet and a filtered liquid outlet, a filter element of substantially constant cross section having an interior communicating with the unfiltered liquid inlet and an exterior communicating with the filtered liquid outlet for filtering solids from the liquid and wherein filtered out solids are left in the interior of the filter element. A cleaning unit is moved axially along the interior of the filter element and carries at least one radially expansible, substantially annular cleaning member movable in an axial path along the interior face of the filter element for removing solids accumulated thereon. In an least one embodiment of the invention, the radially expansible cleaning member is a split ring circumferentially exhaustible by a spring member. In at least one embodiment of the invention, axial reciprocation of the cleaning member is achieved without need to reverse a rotating member.

17 Claims, 17 Drawing Sheets

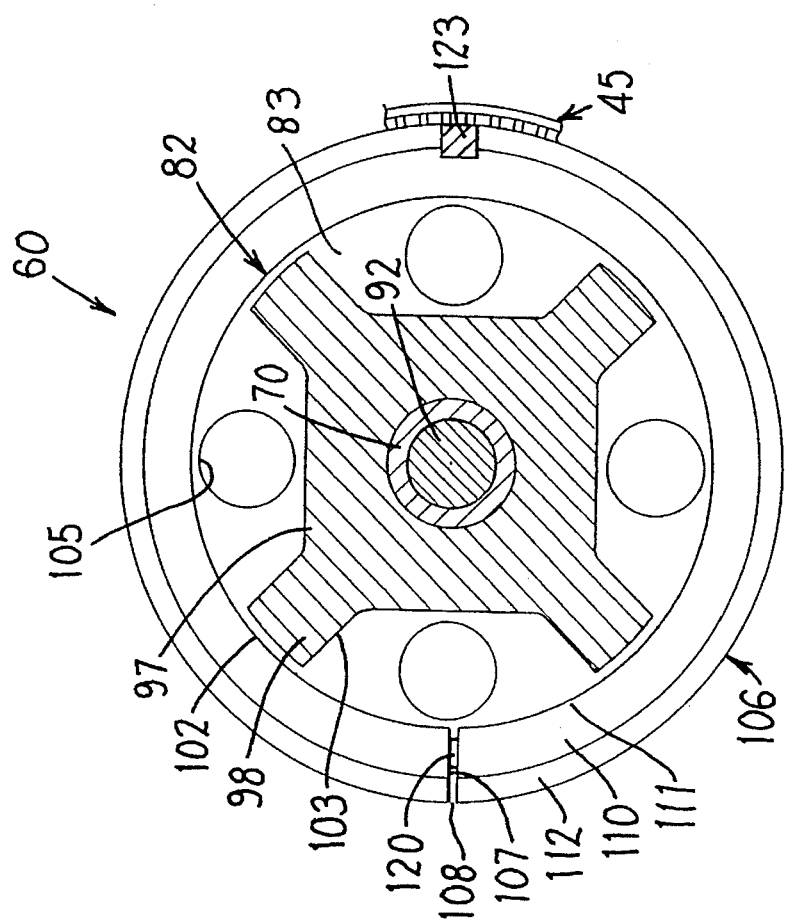
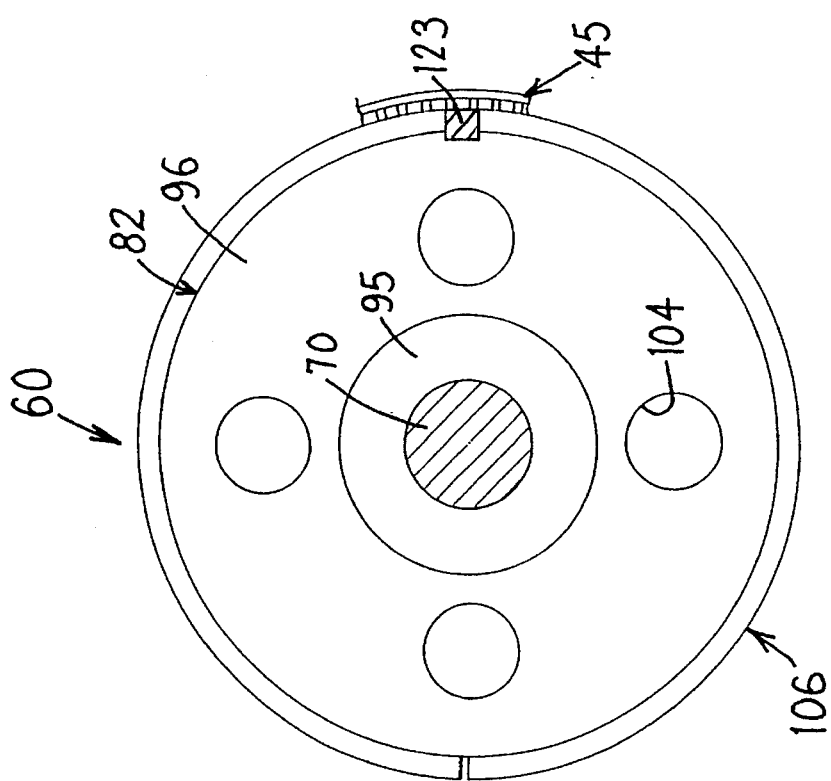

5,527,462

FILTER WITH AXIALLY MOVABLE WIPER

FIELD OF THE INVENTION

This invention relates to an industrial pressure filter system and more particularly to a self-cleaning one having an axially movable cleaning member for cleaning the filter element.

BACKGROUND OF THE INVENTION

U.S. Pat. No. 5,198,111 (attorney's reference RP Case 19), assigned to the Assignee of the present invention, discloses an industrial pressure filter system having a cylindrical filter element, an unfiltered liquid inlet communicating with the interior of the filter element and a filtered liquid outlet communicating with the outside of the filter element. A screw extends axially within the filter element and is rotatable in opposite directions to axially move a cleaning member in opposite axial directions therealong within the filter element for cleaning the inlet side of the filter element. Holes in the cleaning member allow axially flow of liquid to be filtered therethrough, so that liquid to be filtered can always reach substantially the entire length of the filter element. Threadless portions at the end of the screw allow the cleaning member to idle thereon while awaiting a reversal of screw rotation direction. Springs cooperate with the threadless portions to axially urge the cleaning member onto the threaded portion of the screw upon reversal of screw rotation direction to carry the cleaning member back in the opposite direction along the length of the screw. The cleaning member includes a radially thin, radially bendable circular wiper element backed radially by a backing O-ring resiliently compressed diametrally in its cross section for urging the circular wiper element resiliently out against the interior wall of the filter element.

While this prior system has worked well and been commercially successful, a continuing effort to improve thereon has resulted in the present invention.

The objects and purposes of the present invention include providing an improved self-cleaning filter system of the type above generally described. Further objects and purposes of the invention will be apparent to persons acquainted with apparatus of this general kind upon reading the following description and inspecting the accompanying drawings.

SUMMARY OF THE INVENTION

A self-cleaning pressure filter system comprises a housing having an unfiltered liquid inlet and a filtered liquid outlet, a filter element of substantially constant cross section having an interior communicating with the unfiltered liquid inlet and an exterior communicating with the filtered liquid outlet for filtering solids from the liquid and wherein filtered out solids are left in the interior of the filter element. A cleaning unit is moved axially along the interior of the filter element and carries at least one radially expansible, substantially annular cleaning member movable in an axial path along the interior face of the filter element for removing solids accumulated thereon. In at least one embodiment of the invention, the radially expansible cleaning member is a split ring circumferentially expandable by a spring member. In at least one embodiment of the invention, axial reciprocation of the cleaning member is achieved without need to reverse a rotating member.

BRIEF DESCRIPTION OF THE DRAWINGS

FIG. 8 is a sectional view taken substantially on the line 8—8 of FIG. 6.

FIG. 9 is a top view of the FIG. 6 cleaning unit, taken substantially on the line 9—9 of FIG. 6.

DETAILED DESCRIPTION

Figure 1:
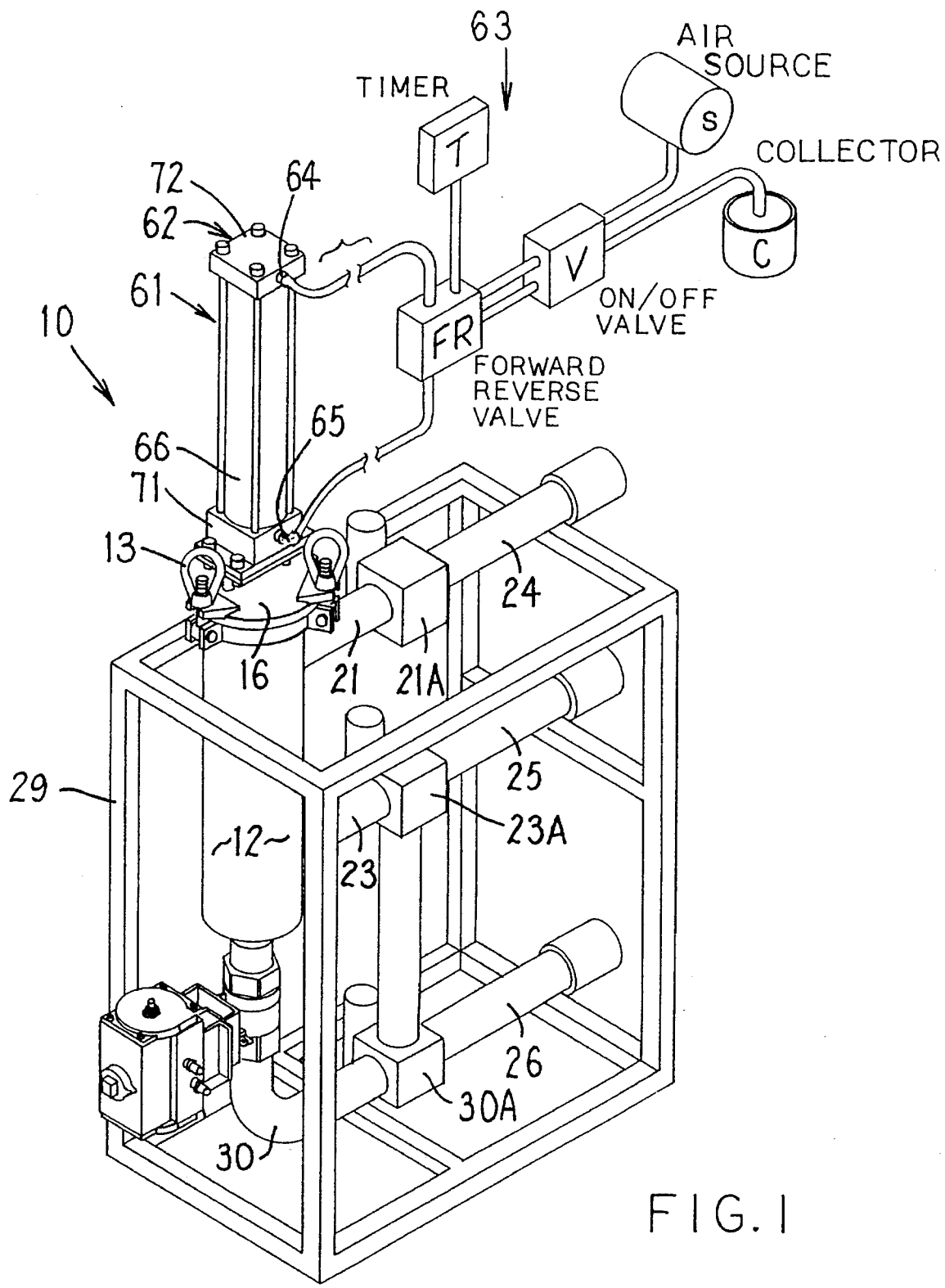
FIG. 1 is a pictorial view of a first embodiment of the invention.
Figure 2:
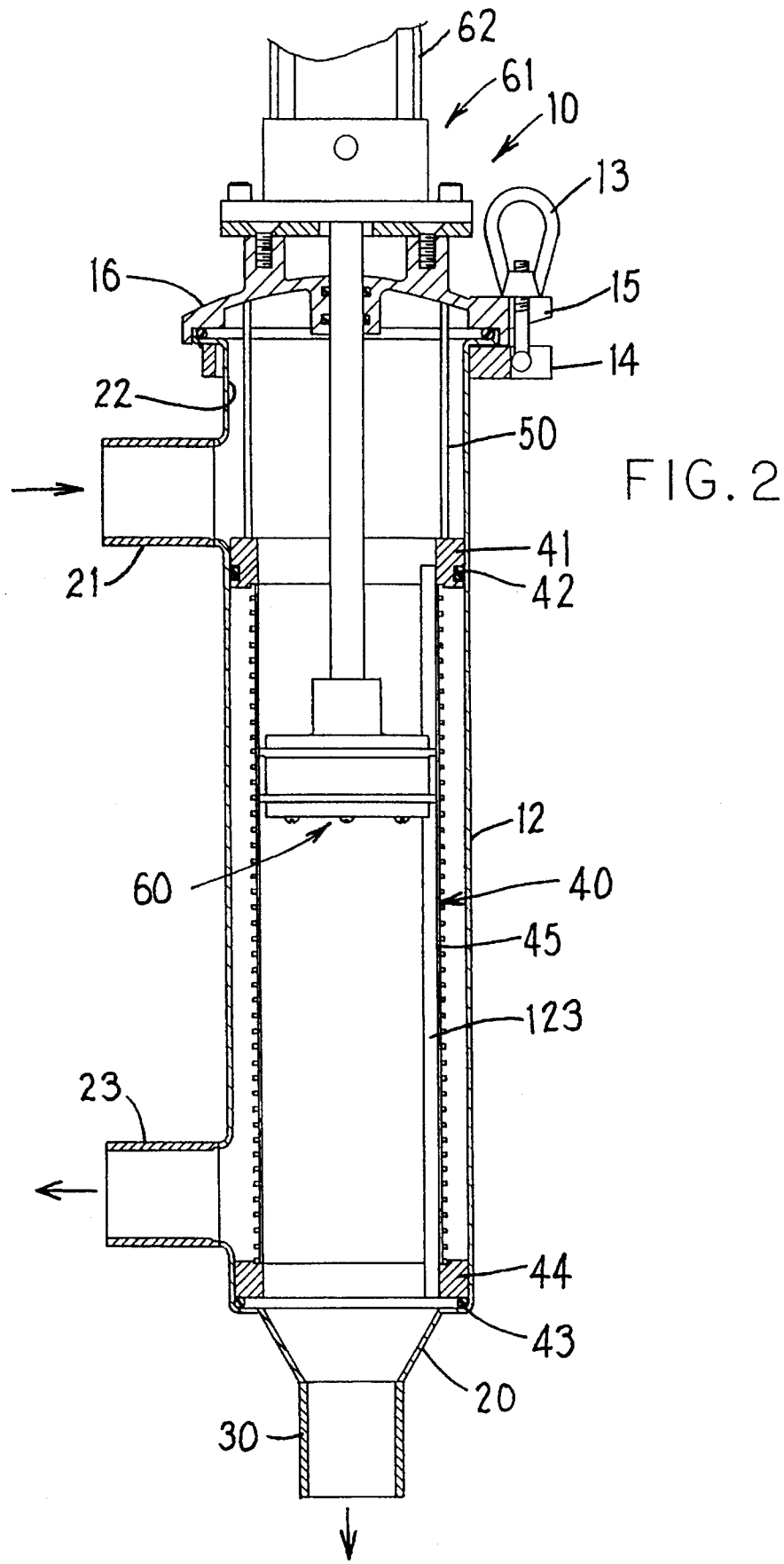
FIG. 2 is a central cross-sectional view, partly in diagrammatic form, of the self-cleaning filter system of FIG. 1.

A filter unit 10 embodying the invention comprises a housing 11 (FIGS. 1 and 2). The filter unit 10 may be oriented as desired, e.g. horizontally or vertically. For convenience in description only and not to limit, the filter unit 10 is here shown and described in an upright orientation. Thus, through housing 11 comprises a constant cross section, tubular casing 12, here upstanding and topped by a cover 16. The bottom (FIG. 2) of the casing 12 is closed by a bottom end cap 20 fixed to the bottom of casing 12.

A process liquid (liquid to be filtered) inlet conduit 21 (FIG. 2) opens through the side wall of the inlet portion of the casing 12, into a process liquid chamber 22 topped by the cover 16. A filtered liquid outlet conduit 23 opens through the sidewall of the intermediate portion of the casing 12. A solids outlet conduit 30, for solids separated from the process liquid, opens through the bottom cap 20 of the casing 12.

The conduits 21, 23 and 30 may be connected in any desired manner to conventional process liquid, filtered liquid and solids drain pipes schematically shown at 24, 25 and 26 respectively in FIG. 1. For example, process liquid to be filtered is conventionally fed from the pipe 24 through a normally open valve 21A in the process liquid inlet conduit 21. Filtered liquid is conventionally fed through a normally open valve 23A in the conduit 23 to the filtered liquid pipe 25. The solids outlet conduit 30 is normally closed by a valve 30A during filtering but is openable to drain collected solids from the filter unit therethrough to a drain pipe 26. The valves 21A, 23A and 30A may be of any conventional type actuable as herein described.

The above discussed structure may be supported on a suitable frame 29 (FIG. 1).

A hollow, circularly cylindrical, filter element 40 (FIG. 2) comprises an annular top collar 41. The top collar 41 is snugly but slidably received within the casing 12 and is liquid sealed with respect thereto by means of a conventional annular seal 42. The bottom of the filter element 40 is defined by a bottom collar 44 (FIG. 4) which is slidably but snugly received within the casing 12 and is liquid sealed with respect thereto by means of a conventional annular seal 43.

The filter element 40 includes a porous filter sleeve 45 (FIGS. 3A and 3B) which may be of any desired rigid conventional construction. In the embodiment shown, the filter sleeve 45 comprises circumferentially close spaced, vertical ribs 46 (FIGS. 3A and 3B) fixed at their ends, as by welding, to the top and bottom collars 41 and 44 and surrounded by annular ribs 47 which are vertically close spaced and are fixed, as by welding, to the outer faces of the vertical ribs 46 to form therewith a filter mesh. The filter pore size is here set by the vertical rib spacing, for example 0.001 inch. It is contemplated that other types of rigid porous filter sleeves may be employed. For example, the filter sleeve 45 may comprise circumferentially close spaced outer vertical ribs bounding annular inner ribs. As a further example, the filter sleeve may comprise a perforated rigid sheet.

To the extent above described, the apparatus is substantially conventional. Attention is now directed to portions of the apparatus more specifically embodying the invention.

In the FIG. 3 embodiment, the cover 16 is conveniently removably affixed to the top of the casing 12 as follows. A ring 14 is fabricated movably around the upper portion of the casing 12, between the inlet conduit 21 and a radially outwardly extending annular flange 14 defining the top of the casing 12. The ring 14 carries evenly circumferentially spaced, hand nutted, threaded studs 13, each pivotable in a respective radial plane of the casing 12 into and out of a respective radially outward extending and opening fork 15 integral with the perimeter of the cover 16. The forks 15 are evenly circumferentially spaced on the cover 16. An annular seal 17 is interposed between the cover 16 and flange 14 to prevent outward leakage of liquid therepast, with the nutted studs 13 in their FIG. 3 position clamping the cover 16 atop the casing 12.

At least two, evenly circumferentially spaced, compression rods 50 fixedly depend from the cover 16 and press down on the top collar 41 of the filter element 40, to seat the bottom collar 44 thereof firmly on the lower annular seal 43, to assure sealing thereof, and to assure fixed location of the filter element 40 within the casing 12 despite up and down movement therein of a cleaning unit 60 hereinafter described.

The cleaning unit 60 (FIG. 3) is coaxially reciprocable within the filter element 40 for cleaning of filtered out solids from the interior side of the filter element. A drive unit 61 (FIGS. 1–3) is actuable to reciprocate the cleaning unit 60 axially within the filter element 40 for such cleaning.

Figure 3:
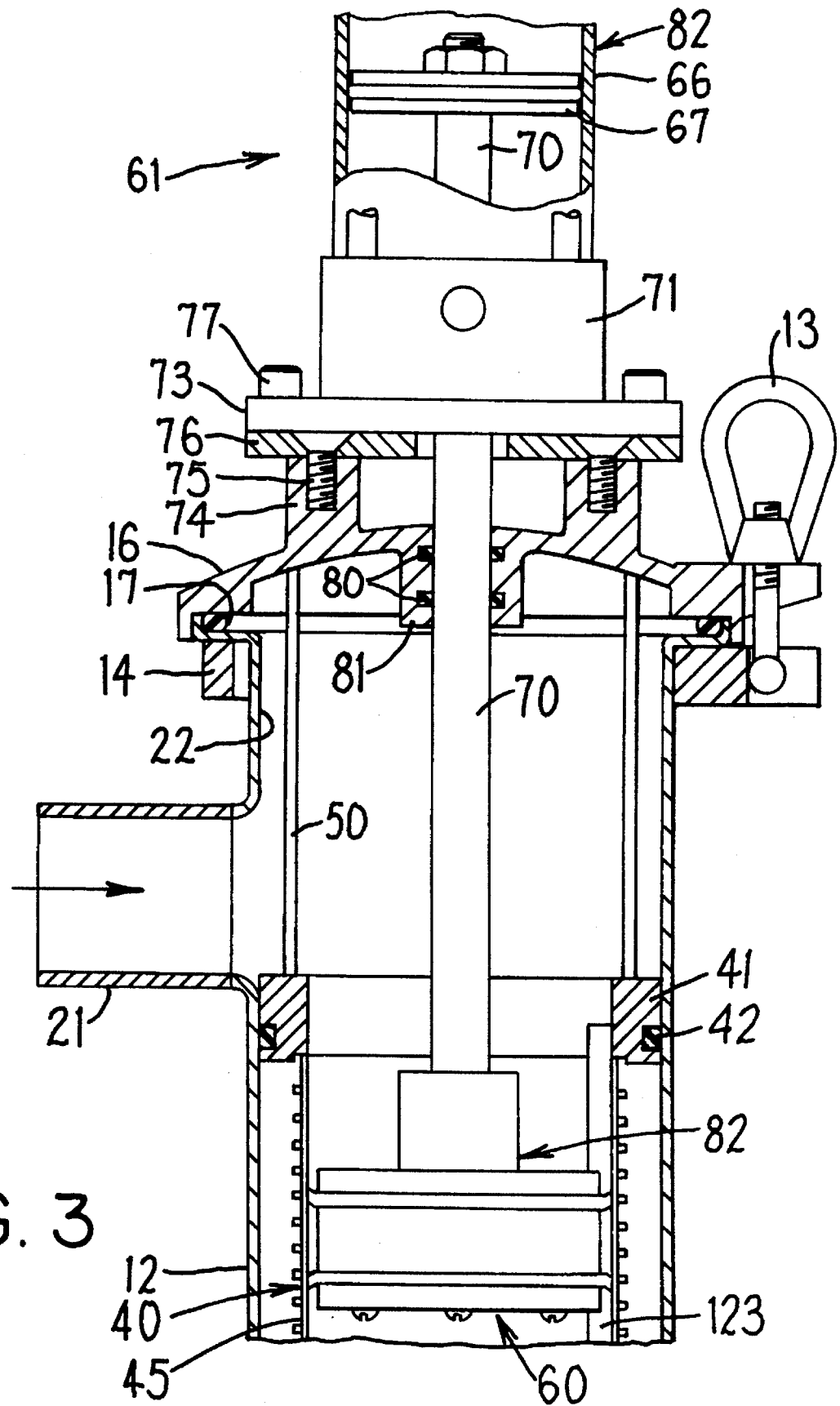
FIG. 3 is an enlarged fragment of FIG. 2 showing the top portion thereof.
Figure 3B:
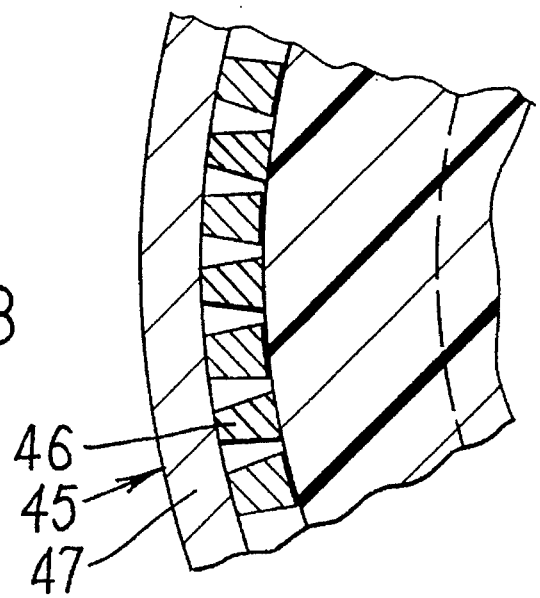
FIG. 3B is a sectional view substantially taken on the line 3B—3B of FIG. 3A.
Figure 3A:
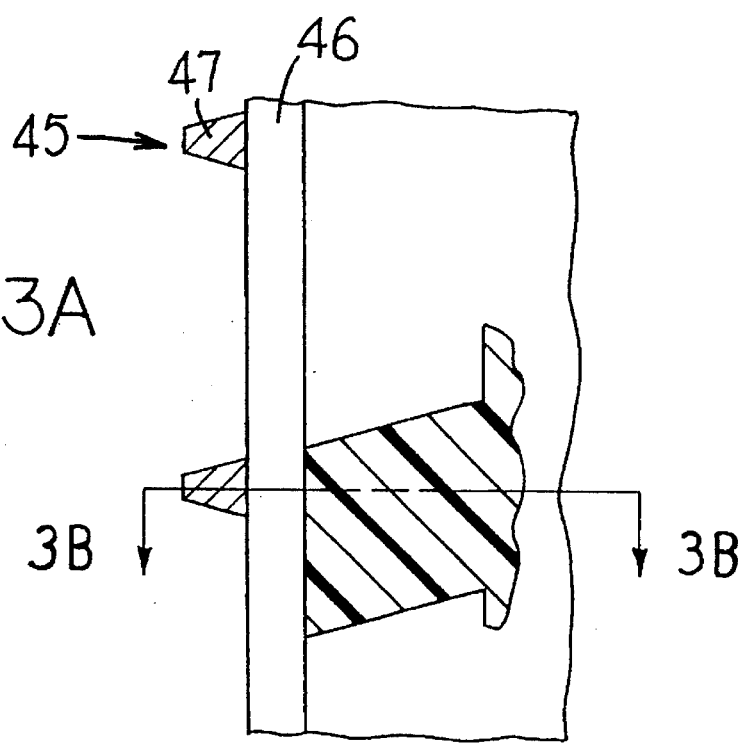
FIG. 3A is an enlarged fragment of the cleaning member and filter element of FIG. 2.

In the FIG. 1–3 embodiment, the drive unit 61 comprises a linear actuator 62 of reciprocable type, preferably a conventional hydraulic or pneumatic cylinder of double acting type, here a compressed air cylinder. This cylinder 62 is energized by any convenient means, here a conventional compressed air control unit 63, for causing reciprocation of the cleaning unit 60. In the preferred embodiment shown, the control unit 63 (FIG. 1) comprises a conventional compressed air source S, for example, a connection to the usual compressed air source in an industrial plant in which the filter unit 10 is to be employed. An on/off valve V is manually actuable to connect the air source S to a forward/reverse valve FR, and therethrough alternatively to top and bottom ports 64 and 65 of the cylinder 62 all through conventional compressed air lines. A conventional control T periodically reverses the forward/reverse valve VR, such that the pressure fluid cylinder 62 has at least sufficient time to move the cleaning unit 60 (FIG. 2) the full length of the filter element 40, for cleaning same, before reversing the forward/reverse valve VR. In this way, the cleaning unit 60 can be made to pause at one or both ends of its travel, continuously reciprocate back and forth along the length of the filter element 40 without pause. The control T may for example, include a pair of limit switches, not shown, to sense the end of travel of the cleaning unit 60 within the filter element 40 and thereby cause the forward/reverse valve FR to reverse the pressure fluid input and exhaust connections thereof to the ports 64 and 65 to thereby effect reversal of movement of the cleaning unit 60. However, in the embodiment shown, the control T comprises a timer (FIG. 1) which times an interval of sufficient length as to allow travel of the cleaning unit 60 the full length of the filter element 40 before reversing the forward/reverse valve FR and thereby reversing the direction of movement of the cleaning unit 60 within the filter element. Thus, under the control of the timer T, the forward/reverse valve FR passes compressed air from the source S through the turned on valve V to the forward/reverse valve FR which in turn applies compressed air to the upper cylinder port 64 to a drive downward the cleaning unit 60 of FIG. 2. At the same time, air is exhausted from the bottom cylinder port 65 through the forward-reverse valve FR and to a suitable collector or muffler C. In the case of a compressed air system, the collector C would normally be a noise muffler, (in a hydraulic system not shown, the collector C would be a return to a hydraulic pump low pressure side, with the high pressure side of such hydraulic pump corresponding to the source S). When the timer T reverses the forward/reverse valve FR, high pressure fluid flows from the source S through the valve V and the forward/reverse valve FR to the bottom port 65 of the cylinder 62, which drives the cleaning unit 60 (FIG. 2) upward, exhaust air from the upper port 64 of the cylinder 62 passing through the forward/reverse valve to the muffler C. The components of the control unit 63 and cylinder 62 are preferably conventional.

The cylinder 62 is conventional and comprises a tubular casing 66 (FIG. 3), here upstanding from that cover 16. A piston 67 is axially reciprocable in the casing 66, by reason of a difference in air pressure above and below it, as provided by the forward/reverse valve FR of FIG. 1. A piston rod 70 (FIG. 3) is affixed to and reciprocated by the piston 67 and extends therefrom through a bottom head 71 of the cylinder 62, coaxially into the filter unit process liquid chamber 22, and into fixed engagement with the cleaning unit 60. The other end of the pressure cylinder casing 66 is closed by an upper head 72 (FIG. 1). The pressure fluid ports 64 and 65 are in the respective heads 72 and 71 of the pressure fluid cylinder 62. The bottom head 71 is provided with a fixed bottom mounting plate 73 (FIG. 3). The piston rod 70 extends conventionally through the bottom head 71 and mounting plate 73 in a sealed but reciprocating manner. The pressure fluid cylinder is fixed coaxially atop the cover 16 as follows. Upstanding bosses 74 are fixed (for example, integrally cast) atop the cover 16. Screws 75 fix a horizontal adapter plate 76 atop the bosses 74. Further screws 77 fix the bottom mounting plate 73 of the cylinder 62 atop the adapter plate 76 and hence in coaxial relation atop the cover 16.

The piston rod 70 reciprocably and coaxially enters the cover 16 through seal rings 80 in a central boss 81 depending from the central portion of the cover 16, so as to prevent liquid leakage from the chamber 22 upward along the piston rod 70 past the cover 16.

Figure 4:
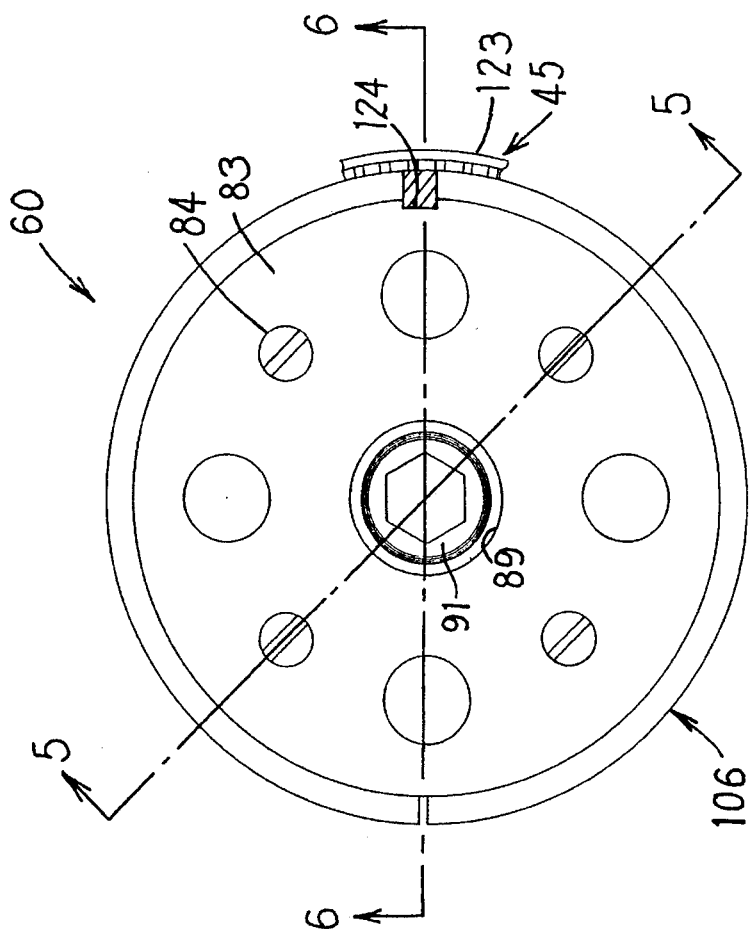
FIG. 4 is an enlarged bottom view of the FIG. 3 cleaning unit.
Figure 5:
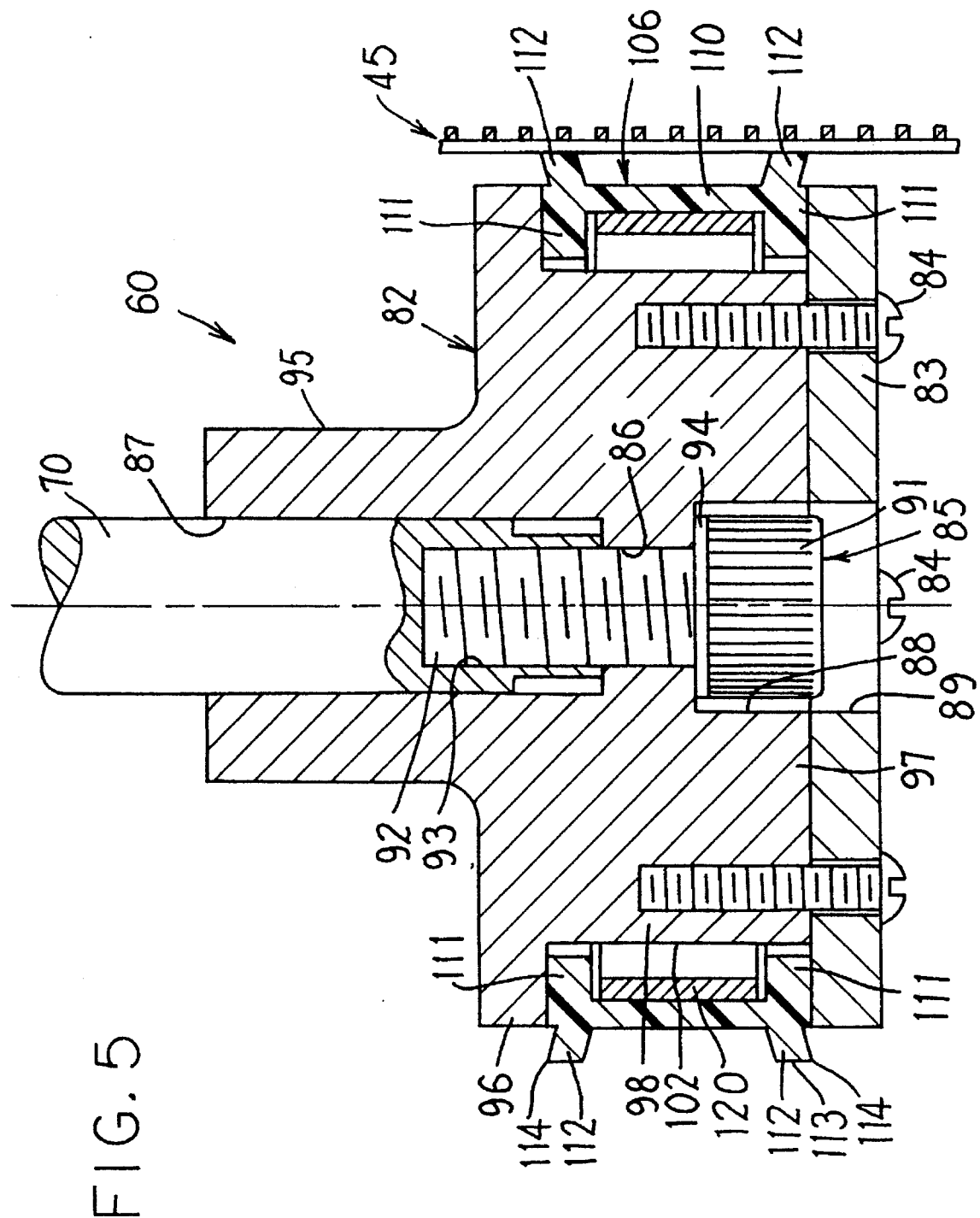
FIG. 5 is a central cross-sectional view taken substantially on the line 5—5 of FIG. 4.

The cleaning unit 60 (FIGS. 3 and 4–9) comprises an annular carrier 82 having an annular retaining plate 83 removably fixed to the bottom thereof, here by screws 84 (FIGS. 4 and 5). The carrier 82 and retainer plate 83 are of outside diameter less than the interior diameter of the filter sleeve 45, to allow liquids and solids axial movement therepast along the filter sleeve interior face.

Figure 6:
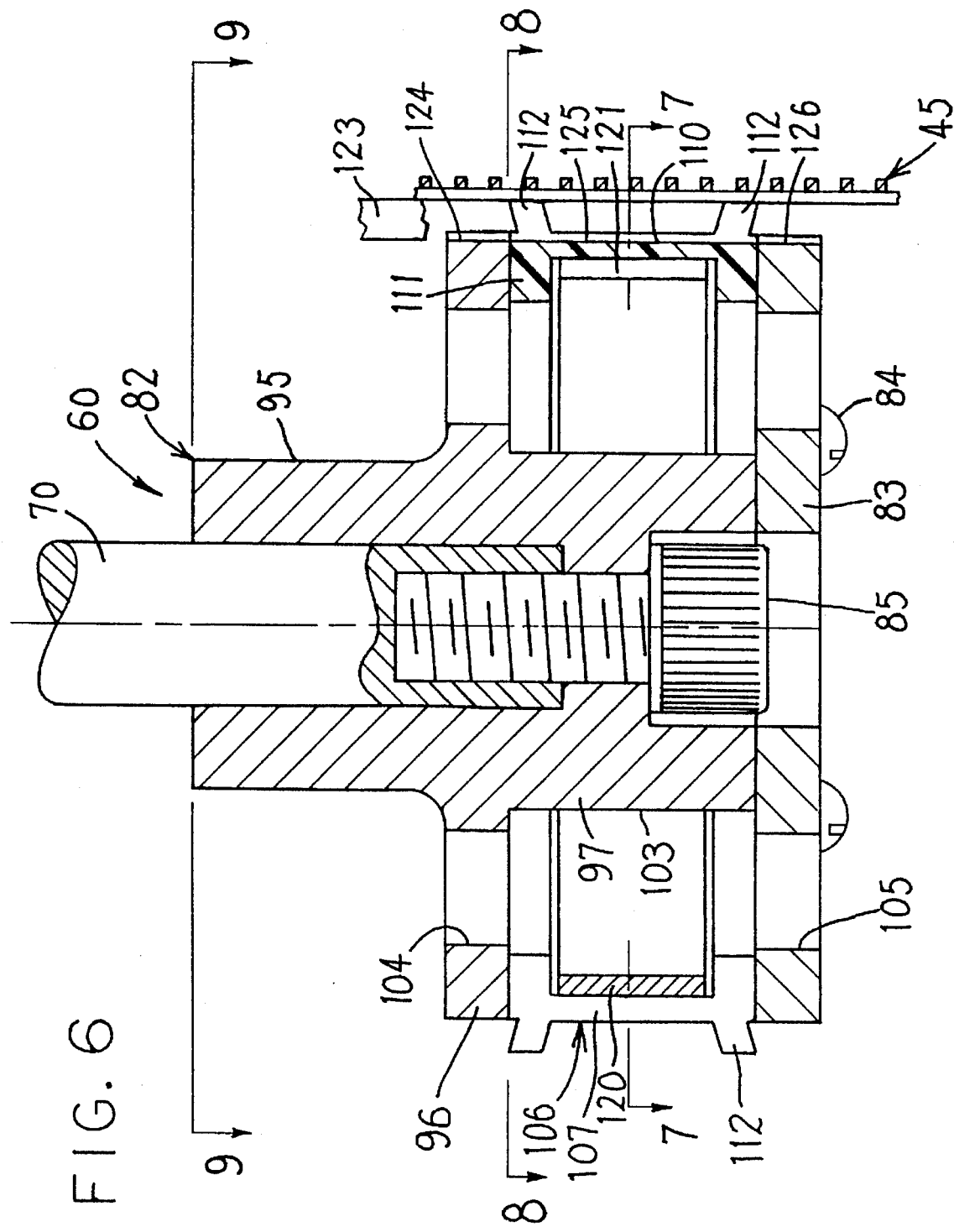
FIG. 6 is a central cross-sectional view taken substantially on the line 6—6 of FIG. 4.

In the embodiment shown, the piston rod 70 is coaxially fixed to the carrier 82 by a mounting screw 85 (FIGS. 5 and 6). More particularly, in the embodiment shown, the carrier 82 is provided with a coaxial central opening 86 (FIG. 5) in turn provided with radially enlarged cylindrical upwardly and downwardly opening recesses 87 and 88. The bottom of the piston rod 70 snugly bottoms in the upward facing recess 87. The enlarged head 91 of the mounting screw 85 is received in the downward opening recess 88, the coaxial shank 92 of the mounting screw 85 extending slidably up through the central opening 86 and threading into a threaded, downwardly opening coaxial bore 93 in the bottom of the piston rod 70, to fix the carrier 82 to the bottom end of the piston rod 70. A central opening 89 in the retainer plate 83 loosely receives the head 91 of the screw upward therethrough. In the embodiment shown, a lock washer 94 on the screw 85 abuts the end of the recess 88 and the screw head 91, to positively prevent loosening of the screw 85. Thus, the carrier 82, and therewith the retainer plate 83, are fixed to and reciprocate with the piston rod 70 in radially loosely spaced relation within the filter sleeve 45.

Figure 7:
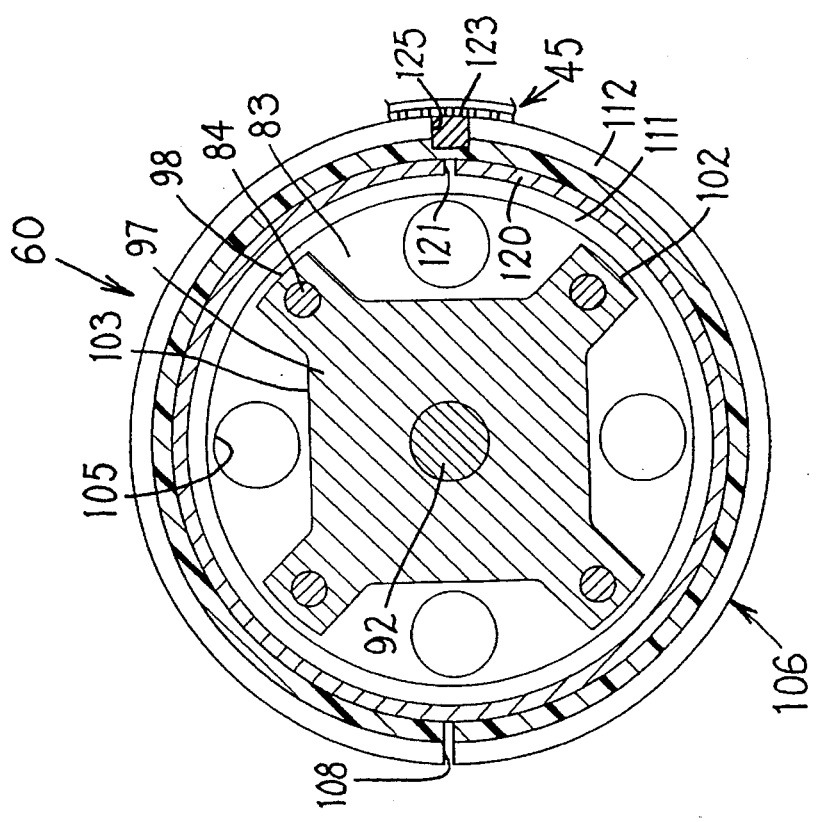
FIG. 7 is a sectional view taken substantially on the line 7—7 of FIG. 6.

Starting from the top in FIG. 6, the carrier 82 comprises an upstanding hub 95 surrounding the piston rod 70, a coaxial, radially outward extending annular flange 96, and a generally square cross section core 97. Four evenly circumferentially spaced, upstanding radial walls 98 radiate from the core 97. The flange 96 is radially coextensive with the retainer plate 83. The radial walls 98 and core 98 are surrounded by the radially outward and axially downward opening annular recess 102 (FIG. 5), topped by the annular flange 96 and in turn surrounding the radially outer edges of the upstanding radial walls 98. The radial walls 98 are in turn circumferentially separated by circumferentially wider, radially outwardly and downwardly facing subrecesses 103 (FIGS. 6 and 7). Process liquid flow holes 104 (FIGS. 6 and 9) open through the radial flange 96 into respective subrecesses 103 and are coaxially aligned with similar process liquid flow holes 105 (FIGS. 6 and 7) in the retainer plate 83. Accordingly, process liquid from the process liquid chamber 22 can flow axially through the process liquid flow holes 104, subrecesses 103 and process liquid flow holes 105 into the portion of the filter sleeve 45 below the cleaning unit 60, to allow filtering of process liquid through the filter sleeve 45 both above and below the cleaning unit 60 at any axial position of the latter within the filter sleeve 45.

The cleaning unit 60 further comprises a cleaning member 106 formed as a split ring (FIGS. 4–9). The cleaning member 106 loosely surrounds the radial walls 98 of the carrier 82 and is axially sandwiched between the carrier flange 96 and retainer plate 83. The split ring cleaning member 106 has circumferential ends 107 (FIGS. 6 and 8) opposed across a circumferential gap 108. The cleaning member 106 is preferably molded of a relatively hard and rigid plastic material, such as polyethylene. Because of its split-ring shape, the cleaning member 106 can flex radially inward and outward, narrowing and expanding the gap 108 (FIG. 8). The cleaning member 106 is of substantially H-shaped elevational cross-section which, as seen in FIG. 5, has a bight formed by an axially extending peripheral wall 110. Radially narrow keeper flanges 111 extend a short distance radially inward integrally from the top and bottom (FIG. 5) of the peripheral wall 110 and are annular except for the gap 108 (FIG. 6).

Lips 112 extend integrally radially outward near the top and bottom of the peripheral wall 110 and are annular except for the aforementioned gap 108 (FIG. 6). The lips 112 diverge slightly in cross-section, as seen in FIG. 5, as they extend radially outward, for example, within an included angle in the range of about 10° to 30°, preferably of 15°. The lips 112 are of generally diamond shaped cross-section (FIG. 5) and have radially outer faces 113 that bear on inside of the filter sleeve 45 for cleaning same. The lips 112 have remote outer edges 113, which in cross-section are defined by acute angles and serve to scrape the solids from the inside wall of the filter screen 45 alternately as the cleaning unit 60 moves in opposite axial directions within the filter screen 45.

A spring 120 (FIGS. 6 and 7) is provided to push radially outward against the peripheral wall 107 of the cleaning member 106, so as to hold the lips 112 thereof firmly radially out against the interior face of the filter screen 45, despite the filter screen having thermal expansion and contraction, variation of diameter, and cross-sectional shape along its length and other imperfections in size and shape. The keeper flanges 111 are radially spaced from the outer ends of the radial walls 98 and the entire split ring cleaning member 106 is of axial height slightly less than the axial height between the carrier flange 96 and retainer plate 83. Thus, the split ring cleaner member 106 is free to move eccentrically on the carrier 82 and retainer plate 83, as well as to radially expand and contract, to continuously maintain its substantially annular lip size in full contact with the filter screen 45.

The cleaning unit 60 of FIGS. 4–9 is intended for use in relatively small diameter filter screens 45, for example, 3" diameter and 4" diameter filter screens 45. To save space, the spring 120 is thus formed as a band of spring material, which is annular except for a circumferential gap 121 (FIGS. 6 and 7). This split ring spring 120 pushes outward radially on the peripheral wall 110 of the cleaning member 106 and is housed axially loosely between the keeper flanges 111 of the cleaning member 106. The radially thickness of the split ring spring 120 is preferably less than that of the keeper flanges 111 such that the split ring spring 120 is always spaced well outboard of the core 97 and radial walls 98 of the carrier 82. The split ring spring 120 in its relaxed, unassembled condition (not shown) is preferably of larger outside diameter than the inside diameter shown of the peripheral wall 110 of the cleaning member 106. Thus, the split ring spring 120 radially outwardly extends the cleaning member 106 as to assure firm continuous contact of the lips 112 with the filter screen 45, despite imperfections in the shape and size of the latter. The split spring ring 120 is thus selected to radially outwardly push the lips 112 against the filter screen 45 with a firm resilient pressure.

Preferably the apparatus is assembled so that the gap 121 of the split ring spring 120 is circumferentially spaced away from the gap 121 of the cleaning member 106.

The minimum inside diameter of the cleaning member 106 (namely at the interior surfaces of the keeper flanges 111), and the interior diameter of the split ring spring 120, are sufficient to keep the cleaning member 106 and split ring spring 120 out of process liquid flow through the holes 104 and 105 of the carrier 82 and retainer plate 83.

Process liquid pressure may drop slightly as process liquid flows from the chamber 22 through the holes 104 and 105 and subrecesses 103, and into the space below the cleaning unit 60. As a result of this pressure drop, some process liquid in the subrecesses 103 may bleed radially outward past the split ring spring 120 and peripheral wall 110, due to the gaps 121 and 108 therein, to invade the radial space 122 between the peripheral wall 110 and filter screen 45, so as to tend to blow accumulated solids out of the annular space between peripheral wall 110 and filter screen 45, namely past the bottom lip 112, again at least through the gap 108 of cleaning member 60.

If desired, an anti-rotate bar 123 (FIGS. 4 and 5) may be fixed, as by welding, lengthwise along the interior face of the filter element 40 and be snugly but slidably received in corresponding notches 124, 125 and 126 in the edges of the annular flange 96 (of carrier 82), cleaning member 106, and retainer plate 83, respectively, positively present any tendency of these elements 82, 106 and 83 to rotate within the filter element 40.

During assembly of the apparatus 10, the filter screen 45 is inserted in the open end of the casing 12 until it stops against the annular seal 43 at the solids outlet end 20 of the casing 12. The filter screen 45 is removable from the casing 12, for example to replace it, by a reversal of this step.

The cleaning unit 60 is assembled by resiliently springing open the split ring cleaning member 106 and resiliently springing closed the ring spring 120, to allow inserting the ring spring 120 past one of the keeper flanges 111 of the split ring cleaning member 106, so as to locate the ring spring 120 within the peripheral wall 120 of the split ring cleaning member 106. The thus combined split ring cleaning member 106 and ring spring 120 are then placed to loosely coaxially surround the core 97 and its spoke-like radial walls 98, and then trapped thereon by fixing the retainer plate 83 to the underside of the core 97 and its radial walls 98. The thus assembled cleaning unit 60 is fixed to the free end of the piston rod 70, with the pressure fluid cylinder already fixed to the outside of the cover 16. The split ring cleaning member 106 is then circumferentially squeezed, to minimize its diameter (either by hand or with the aid of a device similar to an automotive piston ring compression device of conventional type), so as to easily slide the cleaning unit 60 coaxially into the open ends of the casing 12 and filter screen 45. Assembly is completed by fixing the cover 16, with the pressure fluid cylinder 62 thereon, to the open end of the casing 12. The result is the apparatus shown in FIGS. 1–9. Disassembly of the apparatus can be carried out by reversal of the above steps.

Operation of the apparatus of FIGS. 1–9 is carried out as above described, for example under control of the control T.

As the cleaning unit 60 is reciprocated up and down within the filter screen 45 during filtering, the pressurized process liquid from the chamber 22 flows through the cleaning unit 60, namely through the flow holes 104 and 105 and subrecesses 103 therein. Constant flow through the cleaning unit 60 is maintained during both directions of movement of the cleaning unit within the filter screen, by reason of a pressure drop between the incoming process liquid in chamber 22 and the filtered liquid outlet conduit 23. Thus, any solids removed from the filter screen 45 during upward movement of the cleaning unit 60, by the upper lip 112 tends to be washed down through the holes 104 and 105 and subrecesses 103 of the cleaning unit. Dislodged solids tend to collect near the solids outlet conduit 30, along with the solids removed from the filter screen 45 by the bottom lip 112 during the down stroke of the piston rod 70.

MODIFICATIONS

Figure 10:
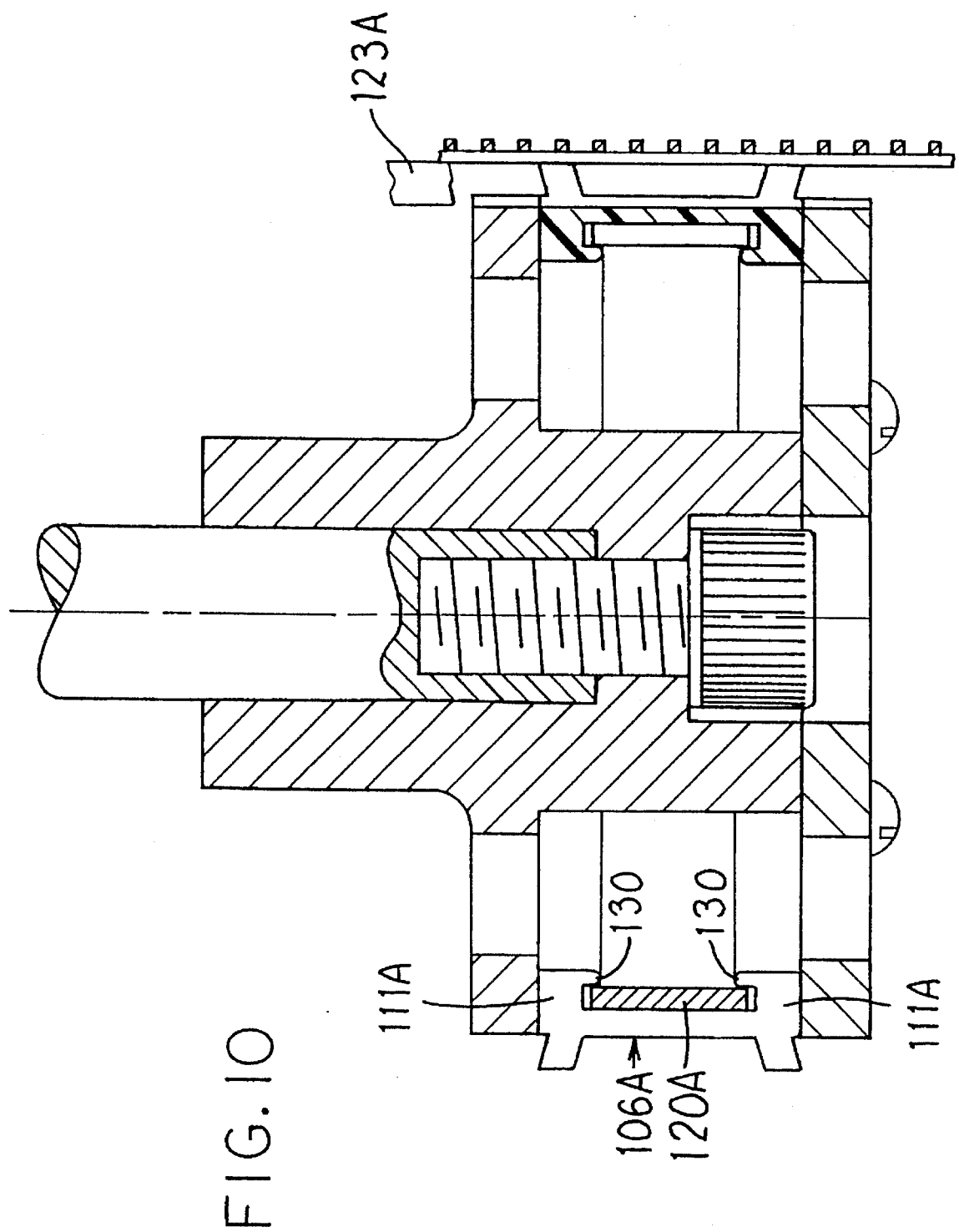
FIG. 10 is a view similar to FIG. 6 but showing a modification.
Figure 11:
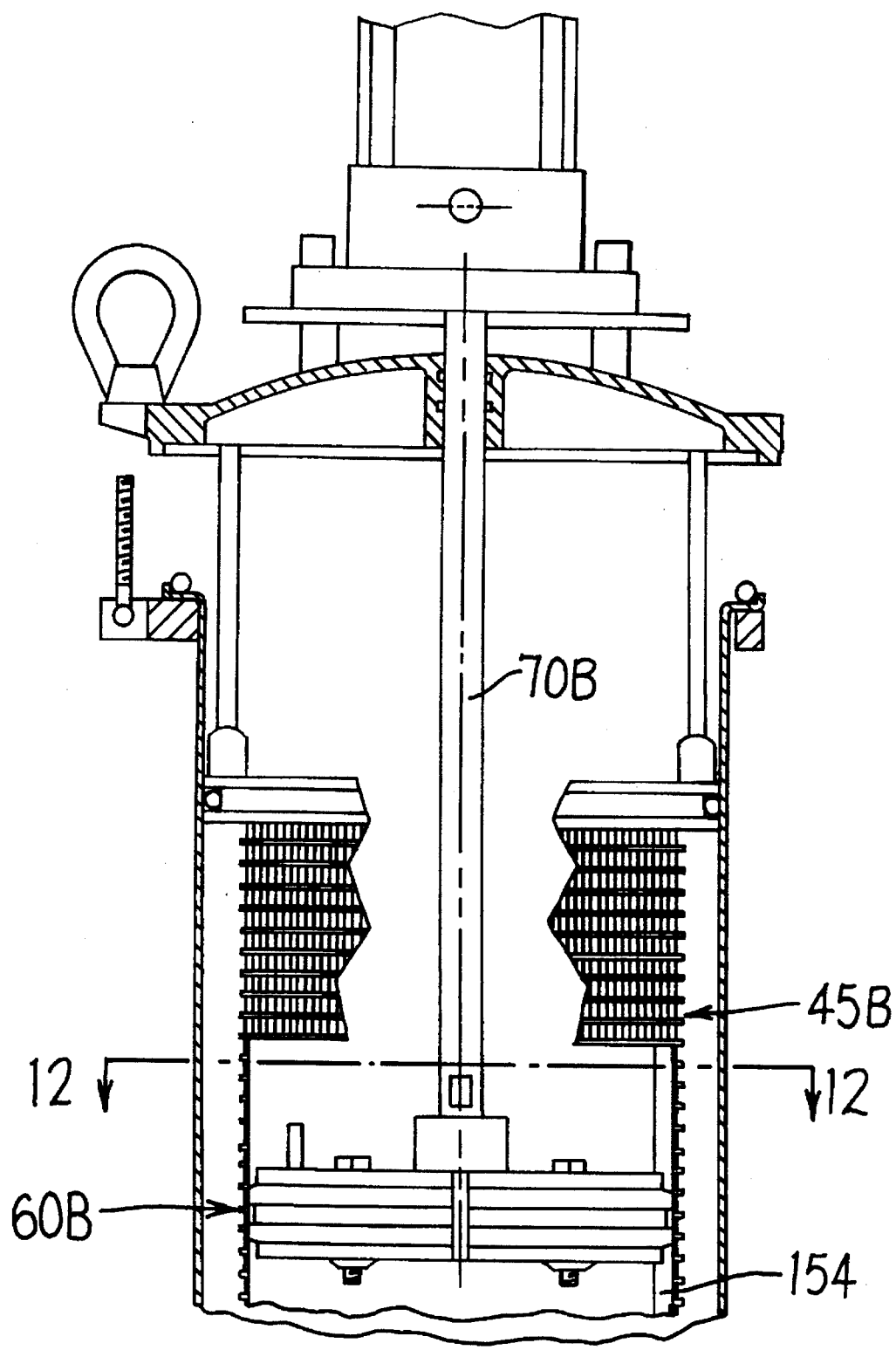
FIG. 11 is a central cross-sectional view similar to FIG. 2, but showing a larger diameter filter element and a modified cleaning unit.

The modified FIG. 10 apparatus is similar to the FIG. 1–9 apparatus above described, except that the split ring keeper flanges 111A fixedly carry circumferentially extending ribs 130 which are axially opposed to each other and located at the radially inner edges of the keeper flanges 111A. The ribs 130 partly axially overlap the ring spring 120A to more positively retain the ring spring 120A within the split ring cleaning member 106A. The modified apparatus 10B of FIGS. 11–15 may be similar to that above described with respect to FIGS. 1–9 except as follows.

In FIGS. 11–15 the filter sleeve 45B is of substantially increased diameter, for example, having a diameter of 5 to 15 inches, and greater length, than the FIG. 1–10 embodiments. The resulting substantially larger diameter of the cleaning unit 60B provides additional room in the cleaning unit 60B for spring biasing and axial through flow.

Accordingly, the modified cleaning unit 60B comprises a split ring cleaning member 106B (FIGS. 14 and 15) having a generally rectangular cross section body 140 supporting radially outward extending, axially diverging, semi-annular cleaning lips 112B and having a gap 108B to facilitate radial and circumferential expansion and contraction of such split ring cleaning member. The split ring cleaning member 106B is axially sandwiched between a pair of retainer plates 141 and 83B (FIG. 15), with sufficient axial clearance to allow radial expansion and eccentric movement of the split ring cleaning member 106B to allow its semi-annular lips 112B to stay in full circumferential contact with the interior of the filter sleeve 45B despite distortions in the shape of the filter sleeve along its length.

Screws 142 and 84B affix the retainer plates 141 and 83B in tight sandwiching relation to evenly circumferentially spaced spacer blocks 143 (here four in number). The spacer blocks 143 are radially spaced from both the split ring cleaning member 106B and a central carrier 82B. The core 97B of the central carrier 82B coaxially fixes and axially properly spaces the retainer plates 141 and 83B with respect to each other. At least one of the retainer plates 141 and 83B is fixed by further screws 144 against rotation with respect to the central carrier 82B. Liquid flow holes 105B (FIG. 12) in the lower retainer plate 83B are coaxially aligned with corresponding liquid flow holes 145 in the upper retainer plate 141. The flow holes 145 and 105B in the two retainer plates 141 and 83B are similar in size and shape. The retainer plates 141 and 83B include radial spoke-like portions 146 and 147 respectively, which separate circumferentially the through holes therein. The retainer plates 141 and 83B have respectively radially inner portions 150 and 151 respectively and outer annular portions 152 and 153 respectively, which radially flank the through holes 145 and 105B respectively, and are connected by the spoke-like portions 146 and 147 respectively. The through holes are large in circumferential extent compared to the spoke-like portions and large in radial extent compared to the radially inner and outer annular portions of the retainer plates, so as to maximize liquid flow through the cleaning unit 60B. The axial spacer blocks 143 and their corresponding screws 142 and 84B are located at radially intermediate portions of the spoke-like portions 146 and 147 of the retainer plates 141 and 83B respectively. Radial spaces are left between the spacer blocks 143 and the split ring cleaning member 106B to allow both radial contraction and eccentric movement of the split ring cleaning member 106B with respect to the retainer plates 141 and 83B and carrier 82B, in response to deviations in the size and shape of the filter sleeve 45B as the cleaning unit 60B reciprocates along the length of the filter sleeve to maintain continuous full cleaning contact of the lips 112B with the inside of the filter sleeve 45B.

A recess 150 (FIG. 15) opens radially inward and downward (FIG. 14) in the cleaning member 106B at a circumferential location bridging the gap 108B. A coil compression spring 151 is housed in the recess and extends chordally across the gap 108B. The spring 151 is compressed along its length in its recess 150 to bear on the circumferential ends of the recess 150 in a manner tending to widen the gap 108B and thereby radially expand the cleaning member 106B. The compressed force of the spring 151 tends to hold it radially seated in the recess 150 and, in any event, the spring is blocked from radially inwardly leaving the recess 150 by the adjacent spacer block 143. The lower retainer plate 83B snugly holds the spring 151 in its recess 150 in a direction axially of the cleaning unit 60B. The restoring force (e.g. 15 to 30 pounds force) of the compressed spring 151 thus resiliently expands the cleaning member 106B to maintain it in full contact circumferentially with the filter sleeve 45B during reciprocation of the cleaning unit 60.

To assist in inserting the cleaning member 60B into the filter sleeve 45B during assembly of the apparatus, upstanding pins 152 are fixed in the top of the body 140 of the cleaning member 106B. The pins 152 extend up loosely through circumferentially and radially wider holes 153 (FIG. 12) in the top retainer plate 141. To easily insert the cleaning unit 60 into the filter screen 45B during assembly of the apparatus, the pins 152 are gripped and squeezed toward each other, either by hand or by means of a suitable pliers-like tool (now shown), to radially shrink the cleaning member 106B and thereby to provide it with a radial clearance as it is inserted into the filter screen 45B. The holes 153 in the top retainer plate 141 are sized and shaped to permit this to be done. Once the cleaning unit 60B is fully within the filter screen 45B, the installer releases the pins 152 to allow the spring 151 to radially expand the cleaning member 106B out into substantially continuous contact with the interior of the filter screen 45B. The cleaning unit 60B can then be reciprocated lengthwise along the filter screen 45B for cleaning same.

Figure 12:
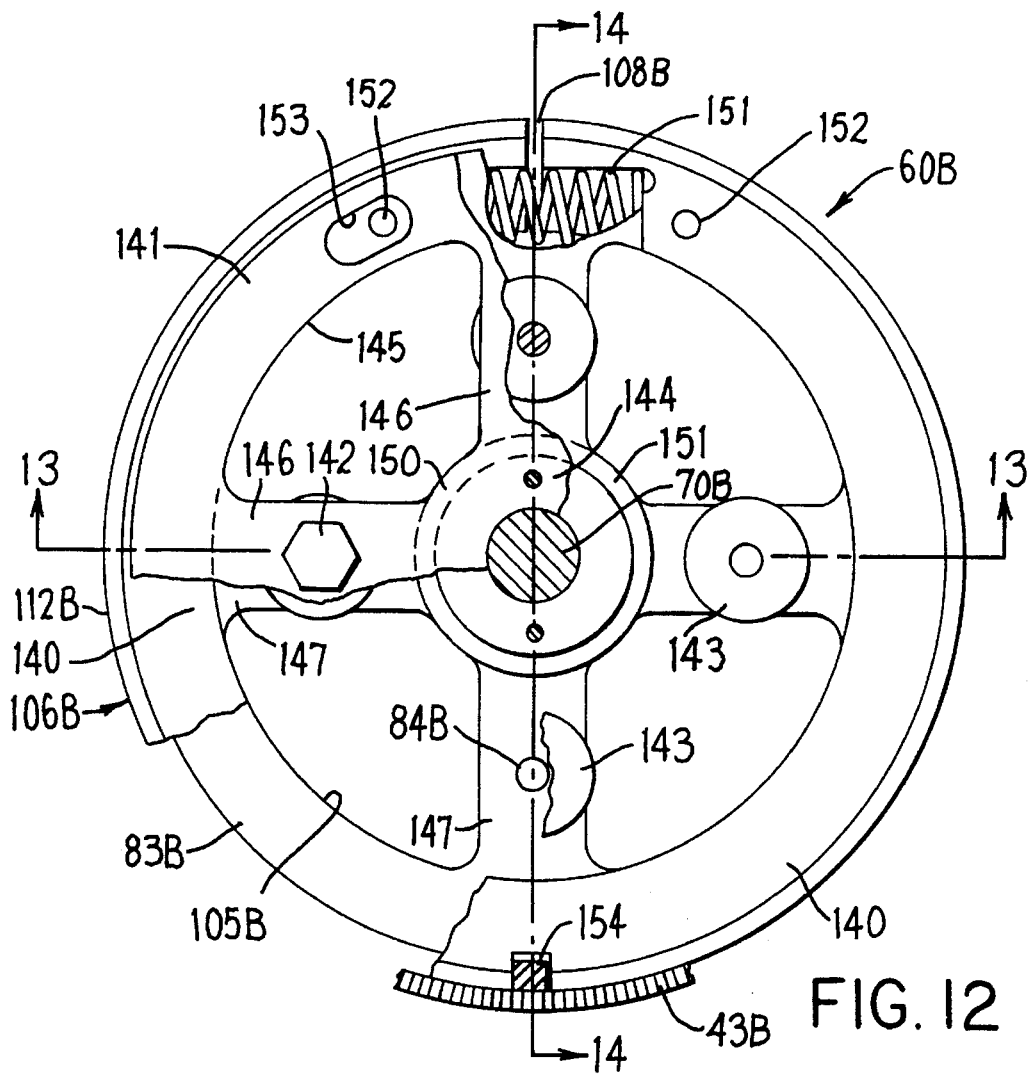
FIG. 12 is an enlarged, partially broken sectional view substantially taken on the line 12—12 of FIG. 11.
Figure 13:
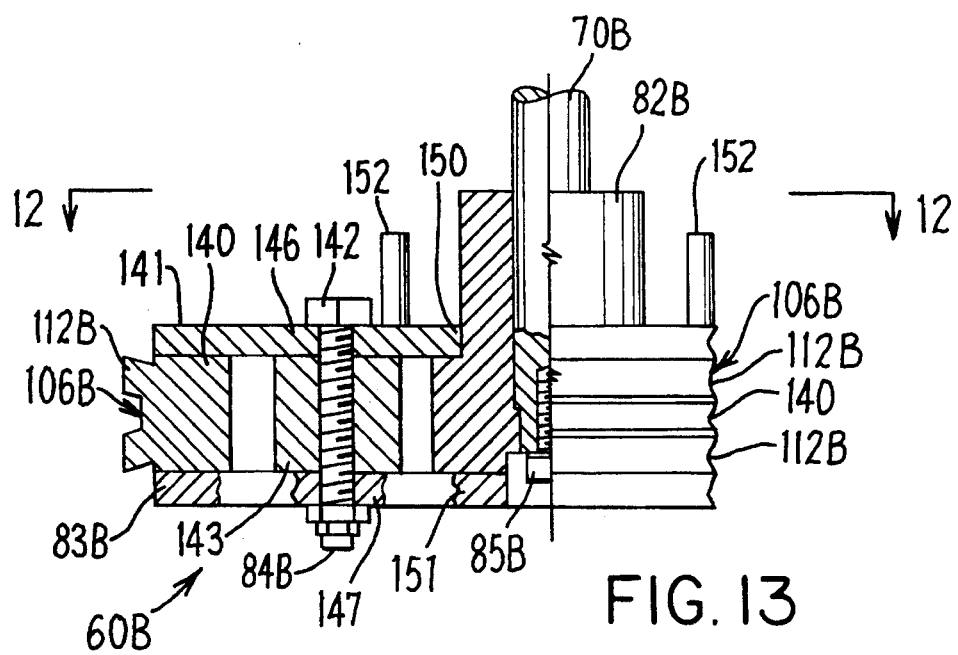
FIG. 13 is a sectional view substantially taken on the line 13—13 of FIG. 12.
Figure 14:
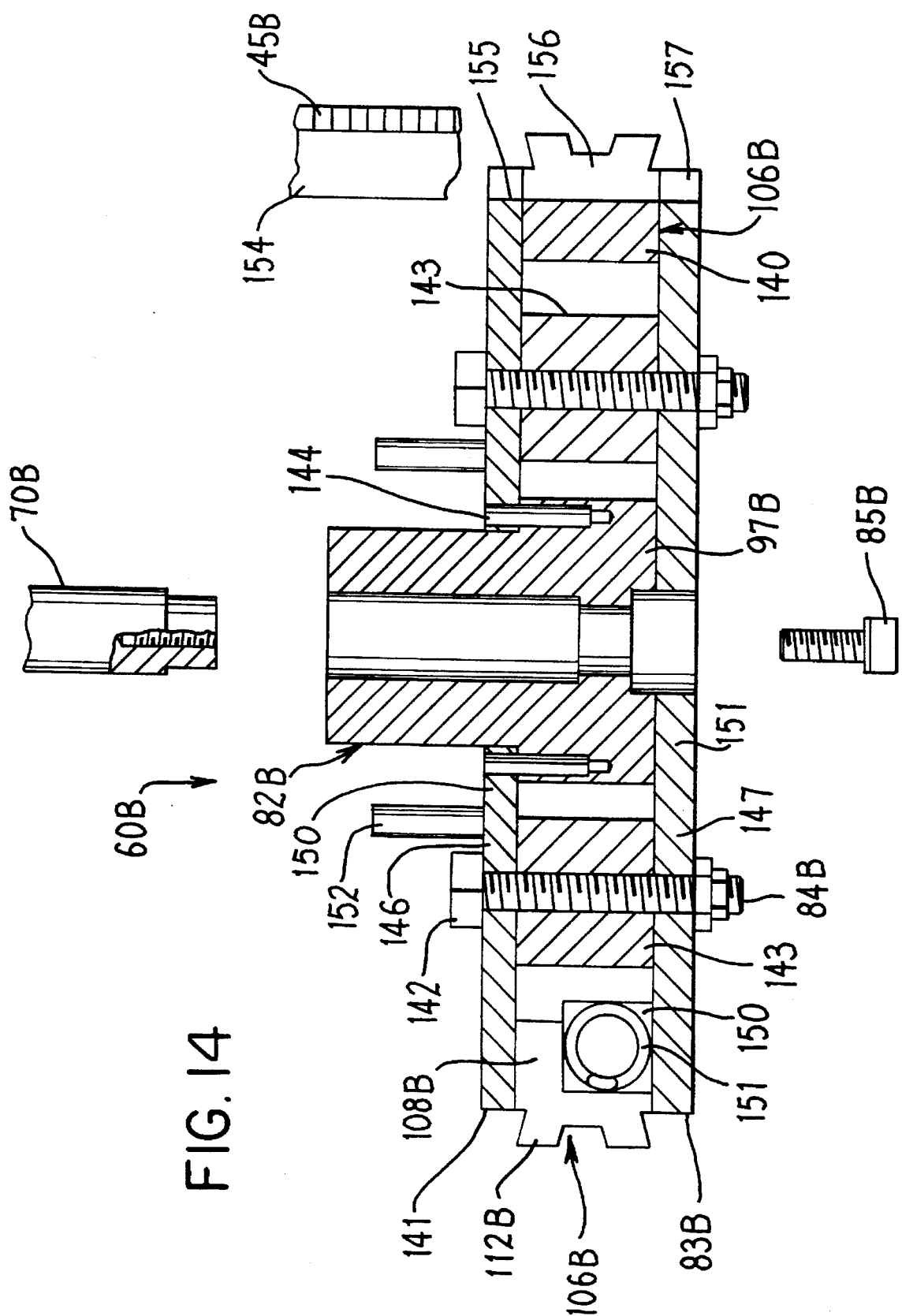
FIG. 14 is a sectional view substantially taken on the line 14—14 of FIG. 12.
Figure 15:
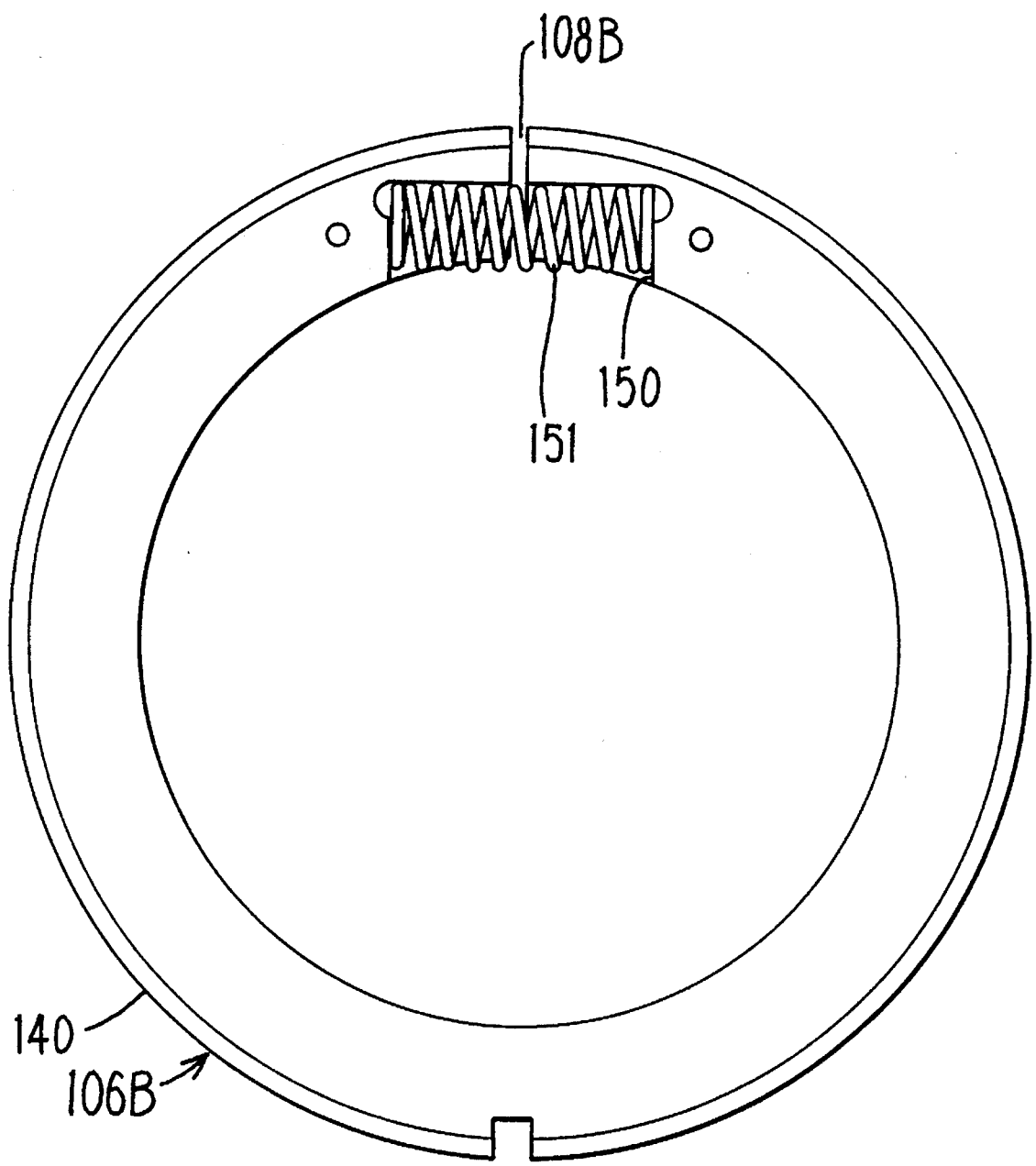
FIG. 15 is a plan view of the FIG. 11 cleaning member.

In the embodiment shown in FIGS. 12 and 15, an axial locator bar 154 is welded to the inside of the filter screen 45B and extends the length thereof. Axially aligned, radially outwardly opening notches 155, 156 and 157 are provided in the perimeter of the upstream retainer plate 141, cleaning member 106B and downstream retainer plate 83B. Such notches 155, 156 and 157 are axially aligned with each other to receive, in clearance relation, the axially extending bar 154, so as to prevent rotation of the cleaning unit 60B with respect to the filter screen 45B.

The cleaning unit 60B is fixed to the piston rod 70B by screw 85B in the manner above described with respect to the FIGS. 1–9 embodiment.

Figure 16:
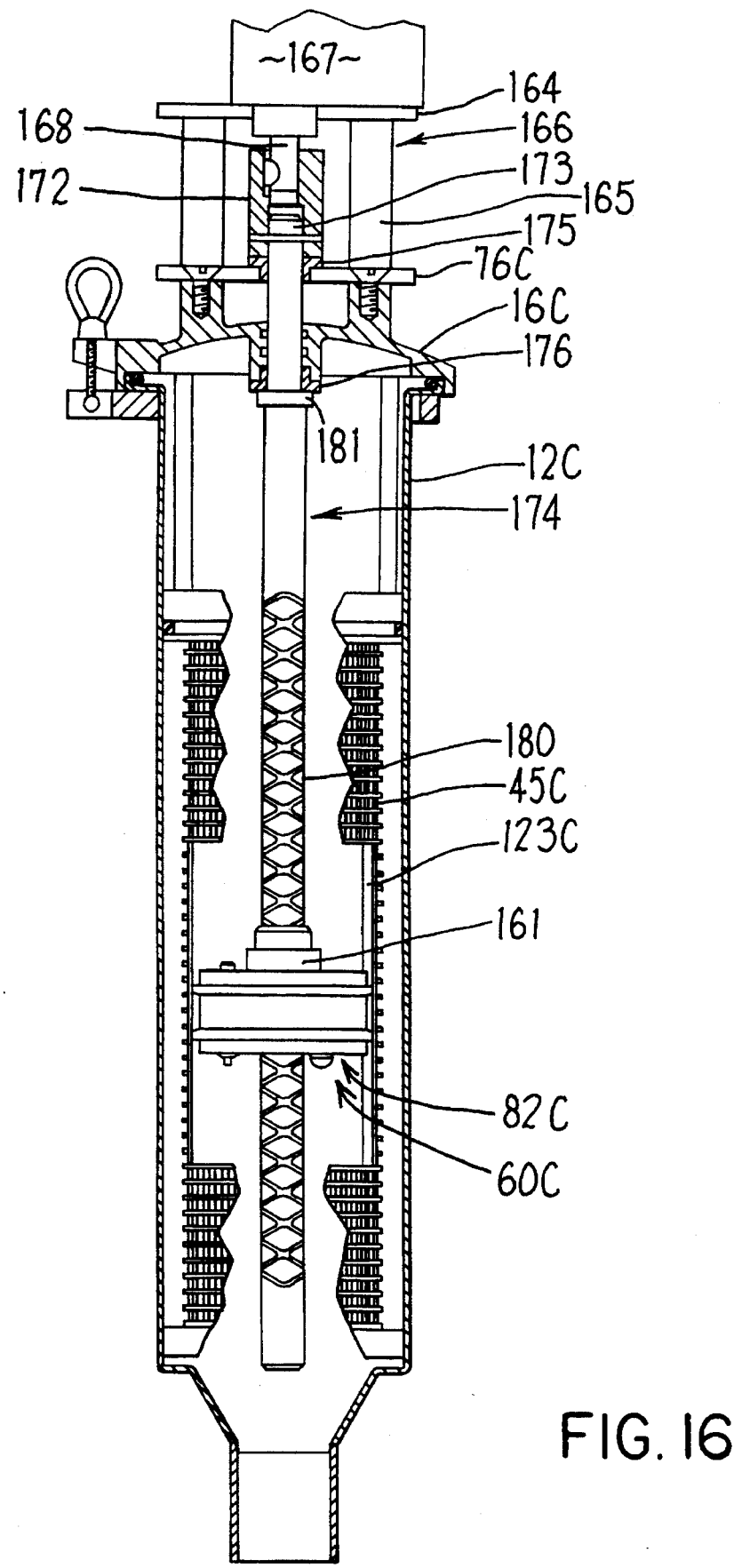
FIG. 16 is a central cross-sectional view similar to FIG. 2 but showing a modification.
Figure 17:
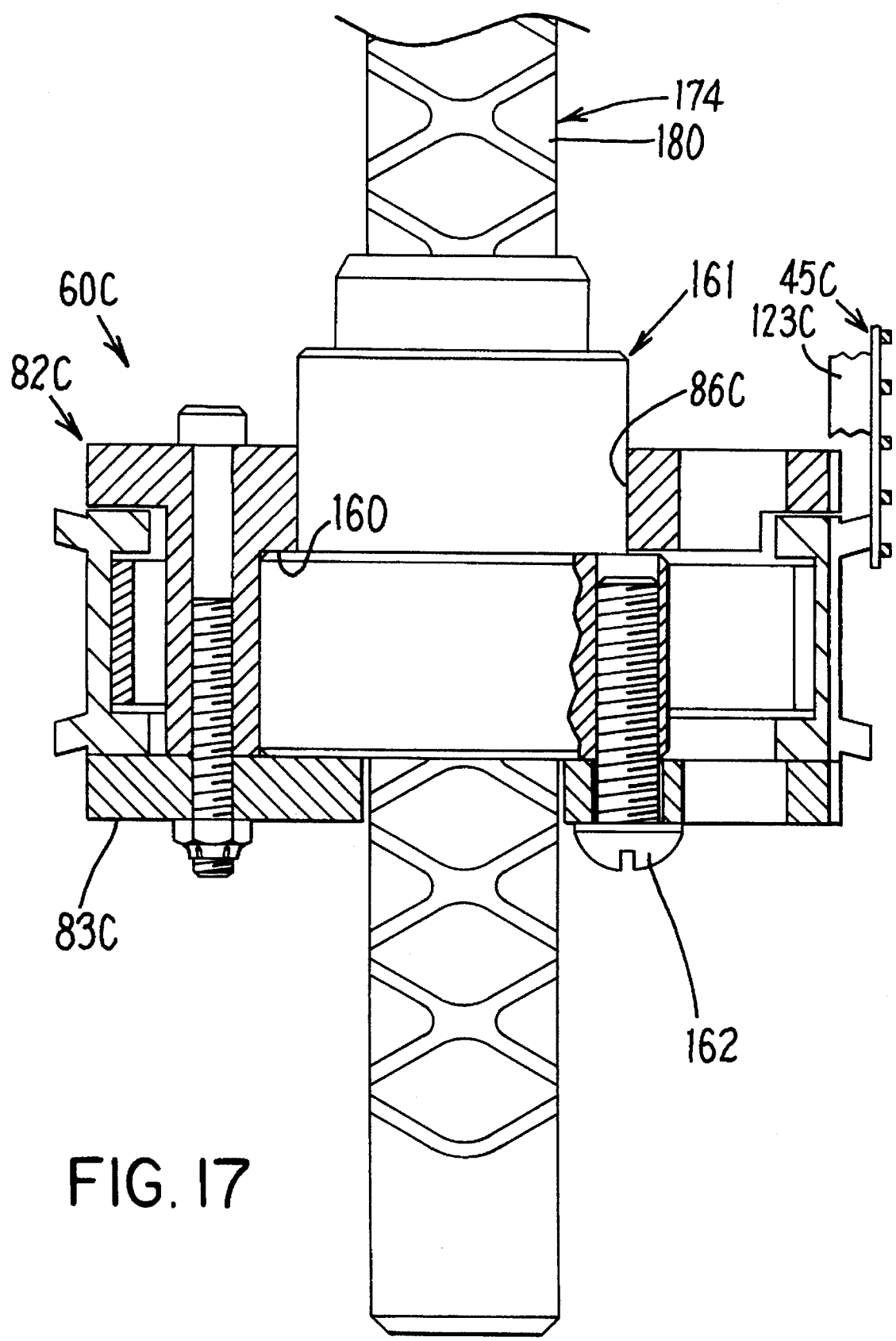
FIG. 17 is an enlarged fragment of FIG. 16.

FIGS. 16 and 17 disclose a further modification which may be similar to the FIGS. 1–9 embodiment, except as follows. As seen in FIG. 17, the coaxial central opening 86C is stepped at 160 to receive a transport nut 161 coaxially therein. The nut 167 is retained axially by the retainer plate 83C and is fixed against rotation with respect to the carrier 82C by circumferentially spaced screws 162 extending up through holes in the retainer plate 83C and threaded eccentrically into the nut 161. Nut/bolt fasteners 163 (FIG. 17) are circumferentially spaced on and axially fix the retainer plate 83C coaxially to the carrier 82C to axially clamp the transport nut 161 fixedly to the carrier 82C.

The cover 16C, by means of its overlying adaptor plate 76C, fixedly supports the upstanding legs 165 and overlying horizontal platform 164 of an upstanding, rigid motor support table 166. The motor support table 166 is a rigid structure which is fixed together and to the supporting adaptor plate 76 by any convenient means not shown, such as welding.

Fixedly mounted atop the platform 164 by any convenient means not shown, such as screws, is a motor 167 having a depending, rotatable output shaft 168. The motor output shaft 168 rotatably drives a tubular coupling 172 fixed to the upper end portion 173 of an elongate, depending, rotatable drive screw 174 by any convenient means. The drive screw 174 extends downward from the coupling 172 through radial thrust bearings 175 and 176 coaxially fixed in central openings in the adaptor plate 76C and cover 16C. The drive screw 174 extends down into the casing 12C and includes a threaded bottom portion 180 that extends down through the filter sleeve 45C. The bearings 175 and 176 also act as axial thrust bearings by acting against the underside of the coupling 172 and against a collar 181 fixed on the drive screw 174 just under the cover 16C. In this way, the bearings 175 and 176 axially and radially fix the drive screw 174 for rotative driving by the motor 167.

The threaded bottom portion 180 of the drive screw 174 extends threadedly through the nut 161 (FIG. 17) fixed on the carrier 82C as above described. The threaded bottom portion 180 of the drive screw 174 is cross threaded (has intersecting clockwise and counter clockwise threads thereon) such that the carrier 82C will thread itself along the rotating threaded bottom portion 180 of the screw and then automatic reverse upon coming to the end of the threaded portion. In this way, continued rotation of the screw 174 in one direction (for example clockwise) will result in repetitive up and down reciprocation of the carrier 82C between the ends of the threaded bottom portion 180 of the drive screw 174. This eliminates any need to periodically reverse the rotation of the drive screw and thereby simplifies the control of the motor 167 and the structure by which it rotatably drives the drive screw 174. Such axially bidirectional, or self-reversing, screw/nut units have long been commercially available. For example, the drive screw 174 and nut 161 may be of the MM 1800 Series available from Flennor/Norco located at Hartford, Conn. The drive screw 174 may be referred to as a self-reversing ball screw.

In the preferred embodiment shown, the portion of the screw 174 below the bearing 176 is radially located only by the bearing of the cleaning unit 60C against the inside of the filter sleeve 45C as the cleaning unit 60C reciprocates axially within the filter sleeve 45C in response to rotation of the drive screw 174. As seen in FIG. 16, the bottom portion of the drive screw 174 is free to bend slightly to allow the cleaning unit 60C to maintain circumferential cleaning contact with the interior of the filter sleeve 45C despite slight bending, or cocking, or eccentric location of the filter sleeve 45C with respect to the central axis of the casing 12C.

Figure 18:
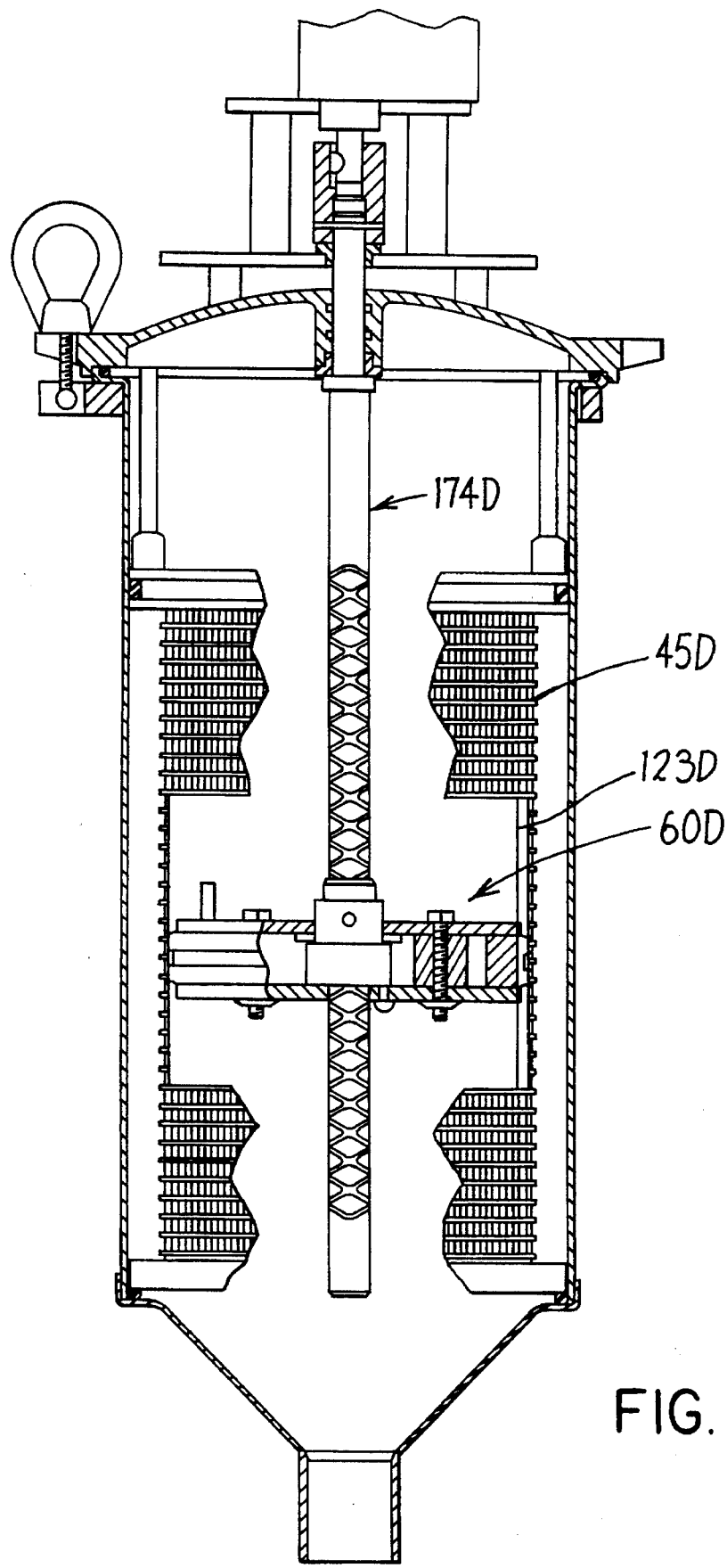
FIG. 18 is a central cross-sectional view similar to FIG. 2 but showing a modification.
Figure 19:
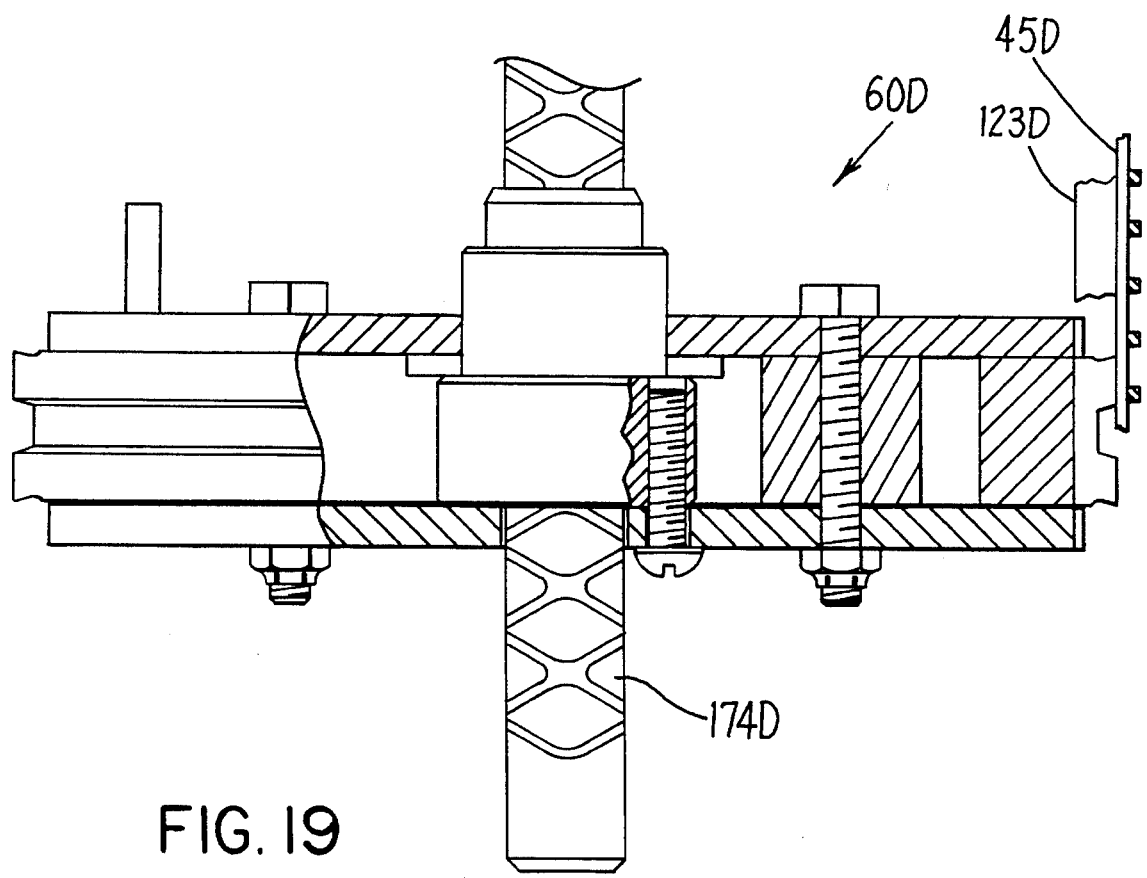
FIG. 19 is an enlarged fragment of FIG. 18.

FIGS. 18 and 19 disclose a further modification which may be similar to the embodiment of FIGS. 16 and 17, except as follows.

More particularly, the embodiment of FIGS. 18 and 19 is intended for use with filter sleeves of substantially larger diameter than that of FIGS. 16 and 17, much like the above described relationship between the embodiment of FIGS. 1–10 to the embodiment of FIGS. 11–15. Thus, whereas the embodiment of FIGS. 16 and 17 employs a cleaning unit 60C similar to that of FIGS. 1–9, the embodiment of FIGS. 17 and 18 employs a cleaning unit 60D similar to that of FIGS. 11–15, except for the inclusion of a nut 161D like that of FIGS. 16 and 17 to enable reciprocation of the cleaning unit 60D by a unidirectionally rotating drive screw 174D, as in the embodiment of FIGS. 16 and 17.

It is particularly desirable in the embodiments of FIGS. 16–19 that the cleaning unit 60C and 60D be prevented from rotating within the corresponding filter sleeve 45C and 45D, in response to rotation of the drive screw 174 or 174D. To this end, the FIG. 16–19 embodiments are here provided with corresponding anti-rotation bars 123C and 123D extending axially along and fixed to the inner surface of the corresponding filter sleeves 45C and 45D and coacting with corresponding notches 124–126C and 124–126D in the corresponding cleaning units 60C and 60D.

Although particular preferred embodiments of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-cleaning pressure filter apparatus comprising:

a housing having an unfiltered liquid inlet and a filtered liquid outlet;

a filter element having a length with a substantially constant cross-section throughout said length, and having an interior in fluid communication with said unfiltered liquid inlet and an exterior in fluid communication with said filtered liquid outlet, for filtering solids from a liquid and wherein filtered out solids from the liquid are left in the interior of said filter element;

a cleaning unit coaxially reciprocable within said filter element for cleaning of filtered out solids from the interior side of said filter element, said cleaning unit comprising a split ring cleaning element having circumferential ends closely opposed across a circumferential gap and means resiliently radially expanding said split ring cleaning element firmly into cleaning contact against the interior of said filter element for removing accumulated solids; and means for reciprocation of said cleaning unit along the interior of said filter element.

2. The apparatus of claim 1 in which said resiliently radially expanding means comprises a helical compression spring having a length axis extending across said gap in said split ring, said helical compression spring being axially compressed in a direction circumferentially of said split ring cleaning element.

3. The apparatus of claim 2 in which said split ring cleaning element includes a recess spanning said gap and being circumferentially substantially wider than said gap, said recess being spaced radially inward from a radially outer end of said gap, said helical compression spring being housed in said recess and having length ends pushing circumferentially against the circumferential ends of said recess, said cleaning unit including a retainer member spaced from said filter element and closely opposing said recess for positively blocking escape of said helical compression spring from said recess in said split ring cleaning element.

4. The apparatus of claim 3 in which said split ring cleaning element has a parallel, circumferentially spaced pair of projections extending axially therefrom and movable closer together for reducing said gap and an effective diameter of said split ring cleaning element to ease installing and removing the latter with respect to the filter element.

5. The apparatus of claim 4 wherein said projections extend axially through eccentric holes in said retainer member.

6. The apparatus of claim 1 in which said resiliently radially expanding means comprises a split ring spring snugly surrounded by said split ring cleaning element and expanding same radially outward against the interior of said filter element for cleaning deposited solids therefrom upon reciprocation of said cleaning unit, said split ring spring being circumferentially compressed when installed in said cleaning unit, as compared to a relaxed condition of said ring spring prior to assembly in said cleaning unit.

7. The apparatus of claim 6 in which said split ring cleaning element has a radially inward facing groove, said ring spring being received in said radially inward facing groove to locate same axially with respect to said split ring cleaning element.

8. The apparatus of claim 7 including at least one axially extending annular flange disposed immediately radially inboard of said ring spring and fixed with respect to said split ring cleaning element for positively preventing radially inward escape of said ring spring with respect to said split ring cleaning element.

9. The apparatus of claim 1 in which said filter element comprises a substantially cylindrical wall of desired cross-sectional shape, said wall comprising a plurality of holes placing the interior and exterior of said filter element in fluid communication, said holes each having two radial ends and being narrower at their radial ends facing the interior of said filter element than at their ends facing away from the interior of said filter element.

10. The apparatus of claim 1 in which said means for reciprocation comprises a pressure fluid cylinder acting between said housing and cleaning unit for reciprocating said cleaning unit longitudinally of and within said filter element.

11. The apparatus of claim 1 in which said means for reciprocation comprises a cross-threaded screw rotatable in one circumferential direction with respect to said housing and a corresponding nut threadedly receiving a cross-threaded part of said screw for reciprocating said cleaning element back and forth along the length of said filter element in response to unidirectional rotation of said screw.

12. The apparatus of claim 11 in which said screw is rotatably supported with respect to said housing at one screw end and is free of said housing at the other end thereof.

13. A self-cleaning pressure filter apparatus comprising:

a housing having an unfiltered liquid inlet and a filtered liquid outlet;

a filter element having a length with a substantially constant cross-section throughout said length, and having an interior in fluid communication with said unfiltered liquid inlet and an exterior in fluid communication with said filtered liquid outlet, for filtering solids from a liquid and wherein filtered out solids from the liquid are left in the interior of said filter element;

a cleaning unit coaxially reciprocable within said filter element for cleaning of filtered out solids from the interior side of said filter element, said cleaning unit comprises a filter element cleaning member formed as a split ring, said split ring having circumferential ends opposed across a circumferential gap, a helical compression spring extending across said circumferential gap of said split ring, for applying an axial expansion force of said helical spring to said split ring on opposite sides of said gap for circumferentially enlarging said split ring and thereby substantially completely circumferentially engaging said split ring with the interior of said filter element for cleaning deposited solids from said filter element during reciprocation of said split ring with a piston rod; and a pressure fluid cylinder fixed with respect to said housing and having said piston rod extending into said housing and axially into said filter element, said cleaning unit being fixed to said piston rod for reciprocation of said cleaning unit along the interior of said filter element in response to reciprocation of said piston rod by said pressure fluid cylinder.

14. A self-cleaning pressure filter apparatus comprising:

a housing having an unfiltered liquid inlet and a filtered liquid outlet;

a filter element having a length with a substantially constant cross-section throughout said length, and having an interior in fluid communication with said unfiltered liquid inlet and an exterior in fluid communication with said filtered liquid outlet, for filtering solids from a liquid and wherein filtered out solids from the liquid are left in the interior of said filter element;

a cleaning unit coaxially reciprocable within said filter element for cleaning of filtered out solids from the interior side of said filter element, said cleaning unit comprises a split ring cleaning element for cleaning the interior of the filter element, said split ring cleaning element having a circumferential gap separating circumferential ends thereof, a split ring spring arranged for pressing said split ring cleaning element radially outward against the interior of said filter element for cleaning deposited solids therefrom upon reciprocation of a piston rod, said split ring being circumferentially compressed when installed in said cleaning unit; and a pressure fluid cylinder fixed with respect to said housing and having said piston rod extending into said housing and axially into said filter element, said cleaning unit being fixed to said piston rod for reciprocation of said cleaning unit along the interior of said filter element in response to reciprocation of said piston rod by said pressure fluid cylinder.

15. A self-cleaning pressure filter apparatus comprising:

a housing having an unfiltered liquid inlet and a filtered liquid outlet;

a filter element having a length with a substantially constant cross-section throughout said length, and having an interior in fluid communication with said unfiltered liquid inlet and an exterior in fluid communication with said filtered liquid outlet, for filtering solids from a liquid and wherein filtered out solids from the liquid are left in the interior of said filter element;

a cleaning unit coaxially reciprocable within said filter element for cleaning of filtered out solids from the interior side of said filter element;

a cross-threaded screw extending into said housing and axially through said filter element, the longitudinal axis of said screw and filter element being parallel;

motor means actuable for continuously rotating said cross-threaded screw; and nut means fixed on said cleaning unit and threaded on said cross-threaded screw for reciprocating said cleaning unit axially back and forth along said screw in opposite axial directions in response to continued rotation of said screw in one rotational direction, such that reversal of axial direction of said cleaning unit is obtained without reversing rotational direction of said screw.

16. The apparatus of claim 15 in which said cleaning unit comprises a filter element cleaning member formed as a split ring, said split ring having circumferential ends opposed across a circumferential gap, a helical compression spring extending across said circumferential gap of said split ring, for applying an axial expansion force of said helical spring to said split ring on opposite sides of said gap for circumferentially enlarging said split ring and thereby for substantially completely circumferentially engaging said split ring with the interior of said filter element for cleaning deposited solids from said filter element during reciprocation of said split ring with said piston rod.

17. The apparatus of claim 15 in which said cleaning unit comprises a split ring cleaning element for cleaning the interior of the filter element, said split ring cleaning element having a circumferential gap separating circumferential ends thereof, a split ring spring arranged for pressing said split ring cleaning element radially outward against the interior of said filter element for cleaning deposited solids therefrom upon reciprocation of said cleaning unit, said split ring spring being circumferentially compressed when installed in said cleaning unit.

* * * * *